United States Patent
Bachelder et al.

(10) Patent No.: US 7,864,071 B2
(45) Date of Patent: *Jan. 4, 2011

(54) EMERGENCY VEHICLE TRAFFIC SIGNAL PREEMPTION SYSTEM

(75) Inventors: Aaron D. Bachelder, Irvine, CA (US); Conrad F. Foster, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/025,630

(22) Filed: Feb. 4, 2008

(65) Prior Publication Data

US 2008/0316055 A1    Dec. 25, 2008

Related U.S. Application Data

(63) Continuation of application No. 10/811,075, filed on Mar. 24, 2004, now Pat. No. 7,327,280, which is a continuation-in-part of application No. 10/642,435, filed on Aug. 15, 2003, now Pat. No. 6,940,422.

(60) Provisional application No. 60/403,916, filed on Aug. 15, 2002.

(51) Int. Cl.
     *G08G 1/07* (2006.01)
(52) U.S. Cl. .................................... 340/906
(58) Field of Classification Search ............... 340/906, 340/907, 916, 917, 933, 935, 902; 701/300, 701/302
     See application file for complete search history.

(56) References Cited

U.S. PATENT DOCUMENTS 3,550,078 A    12/1970  Long
3,831,039 A    8/1974   Henschel (Continued)

FOREIGN PATENT DOCUMENTS

EP    0 574 009 A2    12/1993

(Continued)

OTHER PUBLICATIONS

Co-pending U.S. Appl. No. 10/811,075, filed Mar. 24, 2004, entitled Emergency Vehicle Traffic Signal Preemption System.

(Continued)

*Primary Examiner*—Phung Nguyen
(74) *Attorney, Agent, or Firm*—Christie, Parker & Hale, LLP

(57) ABSTRACT

An emergency vehicle traffic light preemption system for preemption of traffic lights at an intersection to allow safe passage of emergency vehicles. The system includes a real-time status monitor of an intersection which is relayed to a control module for transmission to emergency vehicles as well as to a central dispatch office. The system also provides for audio warnings at an intersection to protect pedestrians who may not be in a position to see visual warnings or for various reasons cannot hear the approach of emergency vehicles. A transponder mounted on an emergency vehicle provides autonomous control so the vehicle operator can attend to getting to an emergency and not be concerned with the operation of the system. Activation of a priority-code (i.e. Code-3) situation provides communications with each intersection being approached by an emergency vehicle and indicates whether the intersection is preempted or if there is any conflict with other approaching emergency vehicles. On-board diagnostics handle various information including heading, speed, and acceleration sent to a control module which is transmitted to an intersection and which also simultaneously receives information regarding the status of an intersection. Real-time communications and operations software allow central and remote monitoring, logging, and command of intersections and vehicles.

13 Claims, 17 Drawing Sheets

U.S. PATENT DOCUMENTS

| | | | |
|---|---|---|---|
| 3,859,624 | A | 1/1975 | Kriofsky et al. |
| 3,881,169 | A | 4/1975 | Malach |
| 3,886,515 | A | 5/1975 | Cottin et al. |
| 4,017,825 | A | 4/1977 | Pichey |
| 4,162,477 | A | 7/1979 | Munkberg |
| 4,223,295 | A | 9/1980 | Bonner et al. |
| 4,230,992 | A | 10/1980 | Munkberg |
| 4,234,967 | A | 11/1980 | Henschel |
| 4,296,400 | A | 10/1981 | Becker et al. |
| 4,433,324 | A | 2/1984 | Guillot |
| 4,443,783 | A | 4/1984 | Mitchell |
| 4,573,049 | A | 2/1986 | Obeck |
| 4,661,799 | A | 4/1987 | Buttemer |
| 4,701,760 | A | 10/1987 | Raoux |
| 4,704,610 | A | 11/1987 | Smith et al. |
| 4,713,661 | A | 12/1987 | Boone et al. |
| 4,734,863 | A | 3/1988 | Honey et al. |
| 4,734,881 | A | 3/1988 | Klein et al. |
| 4,775,865 | A | 10/1988 | Smith et al. |
| 4,791,571 | A | 12/1988 | Takahashi et al. |
| 4,799,162 | A | 1/1989 | Shinkawa et al. |
| 4,914,434 | A | 4/1990 | Morgan et al. |
| 4,963,889 | A | 10/1990 | Hatch |
| 5,014,052 | A | 5/1991 | Obeck |
| 5,043,736 | A | 8/1991 | Darnell et al. |
| 5,068,656 | A | 11/1991 | Sutherland |
| 5,072,227 | A | 12/1991 | Hatch |
| 5,083,125 | A | 1/1992 | Brown et al. |
| 5,089,815 | A | 2/1992 | Potter et al. |
| 5,119,102 | A | 6/1992 | Barnard |
| 5,172,113 | A | 12/1992 | Hamer |
| 5,177,489 | A | 1/1993 | Hatch |
| 5,187,373 | A | 2/1993 | Gregori |
| 5,187,476 | A | 2/1993 | Hamer |
| 5,204,675 | A | 4/1993 | Sekine |
| 5,214,757 | A | 5/1993 | Mauney et al. |
| 5,334,974 | A | 8/1994 | Simms et al. |
| 5,345,232 | A | 9/1994 | Robertson |
| 5,539,398 | A | 7/1996 | Hall et al. |
| 5,602,739 | A | 2/1997 | Haagenstad et al. |
| 5,710,555 | A * | 1/1998 | McConnell et al. ......... 340/916 |
| 5,745,865 | A | 4/1998 | Rostoker et al. |
| 5,889,475 | A * | 3/1999 | Klosinski et al. ............ 340/902 |
| 5,926,113 | A | 7/1999 | Jones et al. |
| 5,955,968 | A | 9/1999 | Bentrott et al. |
| 5,986,575 | A | 11/1999 | Jones et al. |
| 6,064,319 | A | 5/2000 | Matta |
| 6,232,889 | B1 | 5/2001 | Apitz et al. |
| 6,243,026 | B1 * | 6/2001 | Jones et al. ................. 340/906 |
| 6,326,903 | B1 * | 12/2001 | Gross et al. ................. 340/988 |
| 6,603,975 | B1 | 8/2003 | Inouchi et al. |
| 6,617,981 | B2 | 9/2003 | Basinger |
| 6,621,420 | B1 | 9/2003 | Poursartip |
| 6,633,238 | B2 | 10/2003 | Lemelson et al. |
| 6,690,293 | B2 | 2/2004 | Amita |
| 6,724,320 | B2 | 4/2004 | Basson et al. |
| 6,909,380 | B2 | 6/2005 | Brooke |
| 2004/0196162 | A1 | 10/2004 | Brooke |

FOREIGN PATENT DOCUMENTS

| | | | |
|---|---|---|---|
| FR | 2 670 002 A1 | 6/1992 | |
| FR | 2 693 820 A1 | 1/1994 | |

OTHER PUBLICATIONS

Co-pending U.S. Appl. No. 10/704,530, filed Nov. 7, 2003, entitled Method and System for Beacon/Heading Emergency Vehicle Intersection Preemption.

Co-pending U.S. Appl. No. 10/696,490, filed Oct. 28, 2003, entitled Method and Apparatus for Alerting Civilian Motorists to the Approach of Emergency Vehicles.

Co-pending U.S. Appl. No. 10/965,408, filed Oct. 12, 2004, entitled Traffic Preemption System.

Co-pending U.S. Appl. No. 10/960,129, filed Oct. 6, 2004, entitled Detection and Enforcement of Failure-to-Yield in an Emergency Vehicle Preemption System.

Co-pending U.S. Appl. No. 10/410,582, filed Apr. 8, 2003, entitled Emerge ncy Vehicle Control System Traffic Loop Preemption.

Co-pending U.S. Appl. No. 10/942,498, filed Sep. 15, 2004, entitled Forwarding System for Long-Range Preemption and Corridor Clearance for Emergency Response.

*Intelligent Investment*, World Highways/Routes Du Monde, Jan./Feb. 1997, p. 52.

*The Traffic Preemption System for Emergency Vehicles Based on Differential GPS and Two-Way Radio*, http://www.greenf.com/traffic.htm, Greenfield Associates website, 1999, 6 pgs.

Zhaosheng Yang and Deyong Guan, *Study on the Scheme of Traffic Signal Timing for Priority Vehicles Based on Navigation System*, 2001 IEEE, pp. 249-254.

Veerender Kaul, *Microwave Technology: Will it Threaten the Dominance of Optical Signal Preemption Systems?*, May 8, 2002, 5 pgs.

Horst E. Gerland, *Traffic Signal Priority Tool to Increase Service Quality and Efficiency*, Prepared for: APTA Bus Operations Conference 2000, Salem Apr. 2000, 9 pgs.

M. Miyawaki, et al., *Fast Emergency Preemption Systems (FAST)*, 1999 IEEE, pp. 993-997.

K. Fox et al., *UTMCOI Selected Vehicle Priority in the UTMC Environment (UTMC01)*, UTMC01 Project Report 1—Part A, Oct. 19, 1998, 45 pgs.

U.S. Department of Transportation, *Advanced Transportation Management Technologies*, Chapter 6, Transit-Management Systems, Publication No. FHWA-SA-97-058, Apr. 1997, pp. 6-1 through 6-23.

J.D. Nelson, et al., *The Modelling of Realistic Automatic Vehicle Locationing Systems for Service and Traffic Control*, Nov. 9, 1995-Nov. 11, 1995, pp. 1582-1587.

*Assessment of the Application of Automatic Vehicle Identification Technology to Traffic Management*, Appendix C: Evaluation of Potential Applications of Automatic Vehicle Monitoring to Traffic Management, Federal Highway Administration, Jul. 1977, 28 pgs.

Robert N. Taube, *Bus Actuated Signal Preemption Systems: A Planning Methodology*, Department of Systems—Design, University of Wisconsin-Milwaukee, May 1976, 120 pgs.

*Assessment of the Application of Automatic Vehicle Identification Technology to Traffic Management*, Federal Highway Administration, Jul. 1977, 44 pgs.

R. M. Griffin and D. Johnson, *A report on the first part of the Northampton Fire Priority Demonstration Scheme—the 'before' study and EVADE*, Crown Copyright 1980, 4 pgs.

P. M. Cleal, *Priority for Emergency Vehicles at Traffic Signals*, Civil Engineering Working Paper, Monash University, Dec. 1982, 38 pgs.

P. Davies, et al., *Automatic Vehicle Identification for Transportation Monitoring and Control*, 1986, pp. 207-224.

N. B. Hounsell, *Active Bus Priority at Traffic Signals*, UK Developments in Road Traffic Signaling, IEEE Colloquium, May 5, 1988, 5 pgs.

C. B. Harris, et al., *Digital Map Dependent Functions of Automatic Vehicle Location Systems*, 1988 IEEE, pp. 79-87.

P. L. Belcher and I. Catling, *Autoguide-Electronic Route Guidance for London and the U.K.*, 1989 IEEE Road Traffic Monitoring, pp. 182-190.

N. Ayland and P. Davies, *Automatic Vehicle Identification for Heavy Vehicle Monitoring*, 1989 IEEE Road Traffic Monitoring, pp. 152-155.

K. Keen, *Traffic Control at a Strategic Level*, 1989 IEEE Road Traffic Monitoring, pp. 156-160.

K. W. Huddart, *Chapter 7: Urban Traffic Control*, Mobile Information Systems, 1990 Artech House, Inc., 23 pgs.

S. Yagar and E. R. Case, *A Role for VNIS in Real-Time Control of Signalized Networks?*, 1991, pp. 1105-1109.

R. F. Casey, et al., *Advanced Public Transportation Systems: The State of the Art*, U.S. Department of Transportation, Apr. 1991, 91 pgs.

M. F. McGurrin, et al., *Alternative Architectures for ATIS and ATMS*, IVHS Proceedings, May 1992, pp. 456-467.

A. Ceder and A. Shilovits, *A Traffic Signalization Control System with Enhancement Information and Control Capabilities*, 1992 Road Transport Informatics Intelligent Vehicle Highway Systems, pp. 325-333.

*Summary of Findings: Orange County IVHS Review*, Orange County Intelligent Vehicle/Highway Systems Study, JHK & Associates, Aug. 11, 1992, 86 pgs.

*Automatic Vehicle Location/Control and Traffic Signal Preemption Lessons from Europe*, Chicago Transit Authority, Sep. 1992, 140 pgs.

J.D. Nelson et al., *Approaches to the Provision of Priority for Public Transport at Traffic Signals: A European Perspective*, Traffic Engineering Control, Sep. 1993, pp. 426-428.

M. D. Cheslow and S. G. Hatcher, *Estimation of Communication Load Requirements for Five ATIS/ATMS Architectures*, 1993 Proceedings of the IVHS America, pp. 473-479.

M. Kihl and D. Shinn, *Improving Interbus Transfer with Automatic Vehicle Location Year One Report*, Aug. 1993, 35 pgs.

Gunnar Andersson, article entitled *Fleet Management in Public Transport*, The 3rd International Conference on Vehicle Navigation & Information Systems, Oslo, Sep. 2-4, 1992, pp. 312-317.

Horst E. Gerland, *ITS Intelligent Transportation System: Fleet Management with GPS Dead Reckoning, Advanced Displays, Smartcards, etc.*, IEEE-IEE Vehicle Navigation & Information Systems Conference, Ottawa—VNIS '93, pp. 606-611.

Robert F. Casey, M.S., Lawrence N. Labell, M.S., *Evaluation Plan for AVL Implementation in Four U.S. Cities*, May 17-20, 1992 IVHS America Proceedings, 11 pgs.

N.B. Hounsell and M. McDonald, Contractor Report 88, Transport and Road Research Laboratory, Department of Transport, *Bus priority by selective detection cover*, p. 8, p. 22.

David A. Blackledge et al., *Electronic Passenger Information Systems—Do They Give the Public What They Want?*, PTRC 19th Summer, Sep. 9-13, 1991 Annual Meeting, pp. 163-176.

American City & County Website, http://www.americancityandcounty.com, *City uses technology to track buses, emergency vehicles*, Jun. 1, 2001, 1 pg.

Volume Two, The Proceedings of the 1992 Annual Meeting of IVHS America, Surface Transportation and the Information Age, May 17-20, 1992, Newport Beach, CA, 13 pgs.

Labell et al., *Advanced Public Transportation Systems: The State of the Art, Update '92*, U.S. Department of Transportation Federal Transit Administration, 97 pgs.

Stearns et al., *Denver RTD's Computer Aided Dispatch/Automatic Vehicle Location System: the Human Factors Consequence s*, U.S. Department of Transportation, Federal Transit Administration, Sep. 1999, 82 pgs.

APTS Project Summaries, http://www.itsdocs.fhwa.dot.gov, *Advanced Public Transportation Systems (APTS) Project Summaries*, Jun. 1996, Office of Mobility Innovation, 33 pgs.

Brendon Hemily, PhD., *Automatic Vehicle Location in Canadian Urban Transit; a Review of Practice and Key Issues*, Dec. 1988, AATT Conference Feb. 1989, pp. 229-233.

Canadian Urban Transit Association, *Proceedings, The International Conference on Automatic Vehicle Location in Urban Transit Systems*, Sep. 19-21, 1988, Ottawa, Canada, 17 pgs.

1991 TAC Annual Conference, *Proceedings*, vol. 4, Transportation: Toward a Better Environment, 21 pgs.

Casey et al., *Advanced Public Transportation Systems: The State of the Art*, U.S. Department of Transportation Urban Mass Transportation Administration, Component of Departmental IVHS Initiative, Apr. 1991, 91 pgs.

U.S. Department of Transportation, *German "Smart-Bus" Systems, Potential for Application in Portland, Oregon*, vol. 1, Technical Report, Jan. 1993, Office of Technical Assistance and Safety, Advanced Public Transportation Systems Program, A Component of the Departmental IVHS Initiative, 107 pgs.

Arup, *Traffic Management for Bus Operations Main Report*, Prepared by Ove Arup Transportation Planning for the Public Transport Corporation, Dec. 1989, 123 pgs (front and back).

Randy D. Hoffman, et al. *DGPS, IVHS Drive GPS Toward Its Future*, GPS World Showcase, Dec. 1992, 1 pg.

Ivan A. Getting, *Getting—The Global Positioning System*, IEEE Spectrum, Dec. 1993, pp. 37-38, 43-47.

Horst E. Gerland, *FOCCS—Flexible Operation Command and Control System for Public Transport*, PTRC 19th Summer Sep. 9-13, 1991 Annual Meeting, pp. 139-150.

L. Sabounghi et al., *The Universal Close-Range Road/Vehicle Communication System Concept The Numerous Applications of the Enhanced AVI*, 1991 TAC Annual Conference, pp. A41, A43-A62.

R. L. Sabounghi, *Intelligent Vehicle Highway System—The Universal Close-Range Road/Vehicle Communication System Concept—The Enhanced AVI and Its CVO Applications*, 1991, VNIS '91, Vehicle Indication and Information Systems Conference Proceedings, pp. 957-967.

Clarioni, et al., *Public Transport Fleet Location System Based on DGPS Integrated with Dead Reckoning*, Road Vehicle Automation, Jul. 12, 1993, pp. 259-268.

Bernard Held, *Bus Priority: A Focus on the City of Melbourne*, Aug. 1990, Monash University, pp. 157-160, and 180-189.

\* cited by examiner

EMERGENCY VEHICLE TRAFFIC SIGNAL PREEMPTION SYSTEM

CROSS-REFERENCE TO RELATED APPLICATION(S)

This application is continuation of U.S. application Ser. No. 10/811,075, filed on Mar. 24, 2004, now U.S. Pat. No. 7,327,280 which is a continuation-in-part of U.S. application Ser. No. 10/642,435, filed Aug. 15, 2003, now U.S. Pat. No. 6,940,422 which claims the benefit of U.S. Provisional Application No. 60/403,916 filed Aug. 15, 2002, the content of all of which are incorporated herein by reference.

STATEMENT REGARDING FEDERALLY SPONSORED RESEARCH OR DEVELOPMENT

The invention described herein was made in the performance of work under a NASA contract, and is subject to the provisions of Public Law 96-517 (35 U.S.C. §202) in which the Contractor has elected to retain title.

REFERENCE TO COMPUTER PROGRAM LISTING APPENDIX

A computer program listing is submitted herewith on a compact disc (two identical copies) and is incorporated herein by reference. The compact disc contains a ASCII file entitled PreemptionSoftware.txt which is 680 MB in size. The file was created on Nov. 8, 2010.

BACKGROUND OF THE INVENTION

1. Field of the Invention

This invention relates to systems for controlling vehicle traffic signals to allow safe passage of emergency vehicles and more particularly relates to a system for autonomously preempting traffic signals at an intersection that includes a vehicle transponder, a real-time intersection controller and monitor (with an intersection-based visual and/or audio alarm warning system), an operations display and control software, and a wide-area communications network.

2. Background Information

Present systems used to preempt traffic signals and clear intersection for emergency vehicles responding to a life-saving event often come with severe limitations. They rely on: sound activation, optical activation, direct microwave activation, and a combination of all the above. All of these systems have severe operational limitations affected by weather, line of sight, and critical range. These systems often have further drawbacks requiring them to be activated by the emergency vehicle operator or first responder (herein referred to as "e-operator"). These systems also severely disrupt the normal phasing patterns of a traffic controller's nominal programming because these systems do not provide real-time monitoring of intersection phases or timing.

Emergency vehicles currently rely on vehicle horn, sirens, and flashing lights to prevent accidental collisions with pedestrians or other vehicles at intersections. E-operators must focus all their attention on driving the vehicles. Other preemption systems fail to provide visual or audio feedback systems (to either motorists or e-operators) that are physically located in the intersection (herein referred to as "intersection-based warnings"). Such preemption systems compromise motorist and e-operator safety, as there is no awareness of a traffic-light preemption event (referred herein as "silent preemption"). Additionally, these systems fail to provide real-time feedback to e-operators through warning devices inside their vehicles (herein referred to as "vehicle-based warnings"). These factors have the effect that e-operators do not get the feedback required and soon stop using the system.

An intersection-based preemption system that provides feedback and is activated autonomously by an approaching emergency vehicle is needed. Such a system overcomes some of the drawbacks of available systems. Intersection-based visual warnings are proven effective for motorists, and are also critically important to e-operators when multiple emergency vehicles are approaching the same intersections (referred herein as "conflict detection"). These displays are directly in their field-of-vision and e-operators are immediately aware of potential conflicts. Human factors studies often refer to such indicators as "real-world". Intersection-based warnings combined with autonomous activation removes the distraction by keeping drivers' eyes on the road.

A system is needed that takes special consideration of pedestrians. Visual intersection-based warnings may fail to get the attention of pedestrians standing near an intersection. For this reason, audible alerts in addition to visual may be the most effective (and rapid) warning system of the approach of emergency vehicles. There is also the difficulty that pedestrians may often be in harms way if they fail to hear an approaching emergency vehicle. Although vehicle sirens are especially loud, many circumstances can lead to dangerous situations and potential injury. For instance, an especially long crosswalk may take up to 20 seconds to cross. In that time, an emergency vehicle may be heard, perhaps stranding the pedestrian in the middle of a crosswalk. Likewise, in extremely busy metropolitan intersections, ambient noise in the building occlusions may prevent warning of the emergency vehicle until just seconds before the vehicle arrived at an intersection. A system is needed that disables normal pedestrian clearance at intersections long before actual preemption has been triggered (herein referred to as "pedestrian-inhibit"). This system would greatly enhance the safety of emergency vehicle preemption by preventing pedestrians from entering an intersection long before a vehicle arrives (or can be seen or heard).

Existing preemption systems provide little or no visibility, configuration control, or remote interaction with their operation or function. A system is needed that provides real-time feedback, monitoring, logging, and control of vehicle and intersection preemption-related data. This data would be displayed at both mobile stations and central operation center(s). Additionally, a system is needed that provides secure, robust transfer of data to/from intersections, vehicles, and operation center(s) using either wireless or LAN architectures. All of these functions enable logistical commanders and traffic management authorities to coordinate, configure, and monitor activity in the overall preemption network.

It is one object of the present invention to provide an emergency vehicle traffic signal preemption system that is fully autonomous and not dependent on the intersection being in visual range.

Still another object of the present invention is to provide an emergency vehicle traffic signal preemption system that includes a real-time monitor of intersection phase to optimize triggers and timing for both preempt and pedestrian-inhibit functions. This includes minimizing disruption of normal traffic controller behavior and sequencing.

Still another object of the present invention is to provide an emergency vehicle traffic preemption system that includes visual displays in the intersections (and interfaces to such displays) indicating direction and location of approaching emergency vehicle(s).

Still another object of the present invention is to provide an emergency vehicle traffic signal preemption system that provides conflict detection (between emergency vehicles and e-operators) and alerts other emergency vehicles in the area. This conflict detection is provided in two forms: intersection-based warnings and vehicle-based warnings.

Still another object of the present invention is to provide an emergency vehicle traffic signal preemption system that includes a pedestrian audio warning signal to supplement the intersection-based visual display and the audio signals from emergency vehicles.

Yet another object of the present invention is to provide an emergency vehicle preemption system having an autonomous emergency vehicle transponder including an on-board diagnostic (OBD) interface, a real-time navigation interface and position estimation module, and a communications monitor and control interface.

Still another object of the present invention is to provide an emergency vehicle traffic signal preemption system that allows real-time remote access, monitoring, and tracking of the entire preemption system via secure wide-area networks (wireless and LAN). This includes access to the operations display and control software (herein referred to as "operations software") from management centers (TMC, 911-call center, etc.), mobile commanders, as well as individual emergency responder vehicles.

BRIEF DESCRIPTION OF THE INVENTION

The purpose of the present invention is to provide an improved emergency vehicle traffic signal preemption system including autonomous operation, real-time phase monitoring and visual/audio signals to alert motorists and pedestrians of the approach of emergency vehicles.

The system is fully autonomous and is not affected by range, weather, or line of sight. It provides real-time monitoring of the intersection phases to optimize intersection timing and provide the visual display to alert motorist of oncoming emergency vehicle and the direction it is coming from. This system is an improvement for use with the system disclosed and described in U.S. Pat. No. 4,704,610 of Smith et al issued Nov. 3, 1987 and incorporated herein by reference. The system also provides an added feature of conflict indication inside the emergency vehicle operator, indicating that another emergency vehicle is responding and is approaching the same intersection, indicating which vehicle has the preemption and right of way.

This system is unique in that it is fully autonomous and not dependent on the intersection being in visual range. It provides conflict detection and alerts other emergency vehicle operators in the area, has the ability to interrupt pedestrian access, stops preemption when an emergency vehicle stops, and provides interface to and control of the system disclosed and described in the above-identified patent.

The improved emergency vehicle traffic signal preemption system consists of three major subsystems. An intersection monitor and control, an emergency vehicle transponder and its interfaces, and a wide area communications network and its associated proprietary control program software. The emergency vehicle intersection preemption design connects intersections and vehicles over a two-way wide area wireless communications network. This network is synchronized via Global Positioning System (GPS) timing signals. The system is also capable of using existing traffic management LAN networks to relay data to operations center(s).

When an e-operator receives an emergency response request, the vehicle is placed in a priority-code (i.e. Code-3) mode with lights and sirens operating. The vehicle emergency state is read via an emergency-code vehicle interface. At the same moment, the vehicle preemption transponder reads the vehicle on-board diagnostics (OBD) data and determines speed and acceleration, and gathers navigation data from one of several navigation systems. This data is collected by an on-board microprocessor that processes this information and predicts heading and position. Estimation techniques include (but are not limited to) dead reckoning and position hysteresis—historical dependence—and are dependent on the sensor data quality. This information is then formatted, the vehicle identification (ID) and absolute time added, and the data is then transmitted to various both intersections and vehicles within the design area of coverage. The data is also immediately forwarded along the network to subscribing mobile and fixed operations center(s).

Intersection processors receive the data, identify the vehicle's estimate-time-of-arrival (ETA), and compare it with other vehicles possibly approaching their locations. It then determines which vehicle obtains highest priority (depending on location history, priority-type of vehicle, and other factors). The processor sends notification to all approaching emergency vehicles, warns of any potential conflict, and notifies the local e-operators which vehicle has the right of way.

Simultaneously the processor collects real-time intersection phasing and timing information and calculates when preemption should start based on the vehicle(s) ETA. The system includes the real-time monitoring of analog, digital, and stand-alone (disabled monitoring) controllers. This monitoring optimizes preempt behavior and provides a closed-loop verification that preempt commands are executed by the intersection controller.

It also calculates when to trigger the pedestrian-inhibit function to prevent clearance for crossing access. When preemption starts, intersection-based warning displays are sent coded commands via a wireless or hard-line connection to light the proper icons. For each direction, the displays show all preempting emergency vehicles' direction and location, and light the appropriate emergency vehicle message (i.e. "Warning Emergency Vehicle"). All this takes place in real time, in a manner appropriate to insure an intersection is preempted early enough for safe and clear access, and in such a way as to minimized speed reduction for the emergency vehicles.

The system disclosed herein provides a number of improvements of the above-identified patent. It is an autonomous system that does not need involvement of emergency vehicle operator. It also includes expanded system capabilities using emergency vehicle on-board diagnostics (OBD), monitoring multiple emergency vehicles approaching the same intersection using Global Positioning System (GPS), and speed and heading information for multiple emergency vehicles to determine the right of way. An intersection status is transmitted to emergency vehicle dashboards indicating when the intersection is safe to traverse. A dashboard display indicates to the vehicle operator the status of an intersection. The system is also capable of providing dynamic and customized displays via an interface to the vehicle-based PC (personal computer) systems. This interface provides detailed, real-time positioning and status of all neighboring emergency vehicles and intersections. It allows e-operators to view maps with active vehicles and also allows for enhanced conflict detection notification. The system also includes a wide area wireless RF communication links between emergency vehicles and intersections. This system is reliable and unaffected by weather, rain, or lack of line of sight.

Simultaneous to preemption triggers, pedestrian audio alerts are activated when emergency vehicles are approaching an intersection. These are important because often visual signs at an intersection may not be clearly visible to a pedestrian. Beepers, bells, sirens, or even spoken instructions at high volume can be used.

Several types of emergency vehicle location and navigation information retrieval are possible. Among these are Global Positioning Systems (GPS), dead reckoning, beacon triangulation, tags, traffic loop, RDIF, etc. Each vehicle has an identification (ID) tag that allows transmission to the appropriate vehicle that it has the right-of-way to a preempted intersection.

The improvements to the existing system in the above-identified patent are to enhance the performance but the purpose of the system remains the same. That is, to alert and stop vehicles and pedestrians from using an intersection and to allow an emergency vehicle to pass safely. Some prior warning is necessary to allow clearing the intersection. The previous implementation uses a one-way infrared link to transmit approach and departure information of emergency vehicle to the intersection which is equipped with four emergency vehicle status display panels mounted next to the usual traffic lights at each intersection.

The system transmits a signal causing all traffic lights at an intersection to switch to "red" thus stopping all traffic in all directions. In addition, the display panels flash a relatively large "emergency vehicle" therein with a graphic display indicating the lane and direction of traffic taken by an emergency vehicle. The range of the infrared transmitter can be as much as 1,000 feet allowing sufficient time to clear the intersection. The new improved system utilizes a wide area wireless RF two-way communication link between emergency vehicles and intersections. This method is more reliable and not affected by weather, lack of line of sight, range limitation or obstructions.

Another advantage of the two-way wireless RF communications link between the intersections and emergency vehicles is the ability to display much more useful data in the vehicles helping the vehicle operator maneuver his vehicle most efficiently and safely. This data includes (but is not limited to) emergency-code levels, vehicle acceleration, vehicle type, and vehicle health. This method also enables feedback communication to be sent from the intersections to the vehicles, providing vehicle-based warnings (or confirmation) of system activity. Intersection "green" status shows when an intersection has been preempted and priority is given to the receiving vehicle, allowing safe passage. If more than one emergency vehicle approaches an intersection, the system determines which vehicle should have the right of way depending on location information (GPS, traffic loop, beacon, etc.), direction and speed sent to the intersection control. A proprietary control program determines the right of way and sends the result to emergency vehicles. The encrypted data package transmitted over transceivers is tagged with the vehicle ID and time to insure proper and certified utilization.

Another improvement to the system is an audio warning system intended to alert pedestrians that an intersection has been preempted and must be kept clear. One desirable implementation would utilize loudspeakers mounted near the four corners of the intersection where pedestrians normally gather to cross. A spoken message, such as "warning, emergency vehicle approaching, do not walk", may be most preferred but any audible signal such as a wailing sound, a siren, or any other familiar emergency sound may be utilized.

Another goal of the improved system is creation of an autonomous system that is activated by reception of a priority-code (i.e. Code-3) status or alarm. The operator of the emergency vehicle can concentrate on his primary duty which is to arrive at the sight of the emergency safely in the shortest time possible without worrying about the activation of the system. A priority-code starts the process of communication between an intersection that is being approached and the emergency vehicle and the system performs the functions described above. Also, both vehicle-based warnings and intersection-based warnings provide positive feedback that an e-operator has secured an intersection. This directly translates into a reduction of emergency workers' stress levels.

The information available from the emergency vehicle and intersection controllers may be transmitted to a central location such as a dispatch center or traffic control center to display the status of multiplicity of intersections and emergency vehicles. Such information being displayed on a status board can be invaluable in managing emergency situations (especially large-scale incidents) in a more sufficient manner because it makes available information on a real-time basis for the officials in charge. Commands and configuration information can also be sent back to intersections and vehicles to instantly meet changing needs or requirements. These instructions can include the creation of large emergency corridors (herein referred to as an "e-corridor") whereby a series of sequential intersections are preempted in the same direction.

The above and other objects, advantages, and novel features of the invention will be more fully understood from the following detailed description and the accompanying drawings, in which:

DETAILED DESCRIPTION OF THE INVENTION

Figure 5:
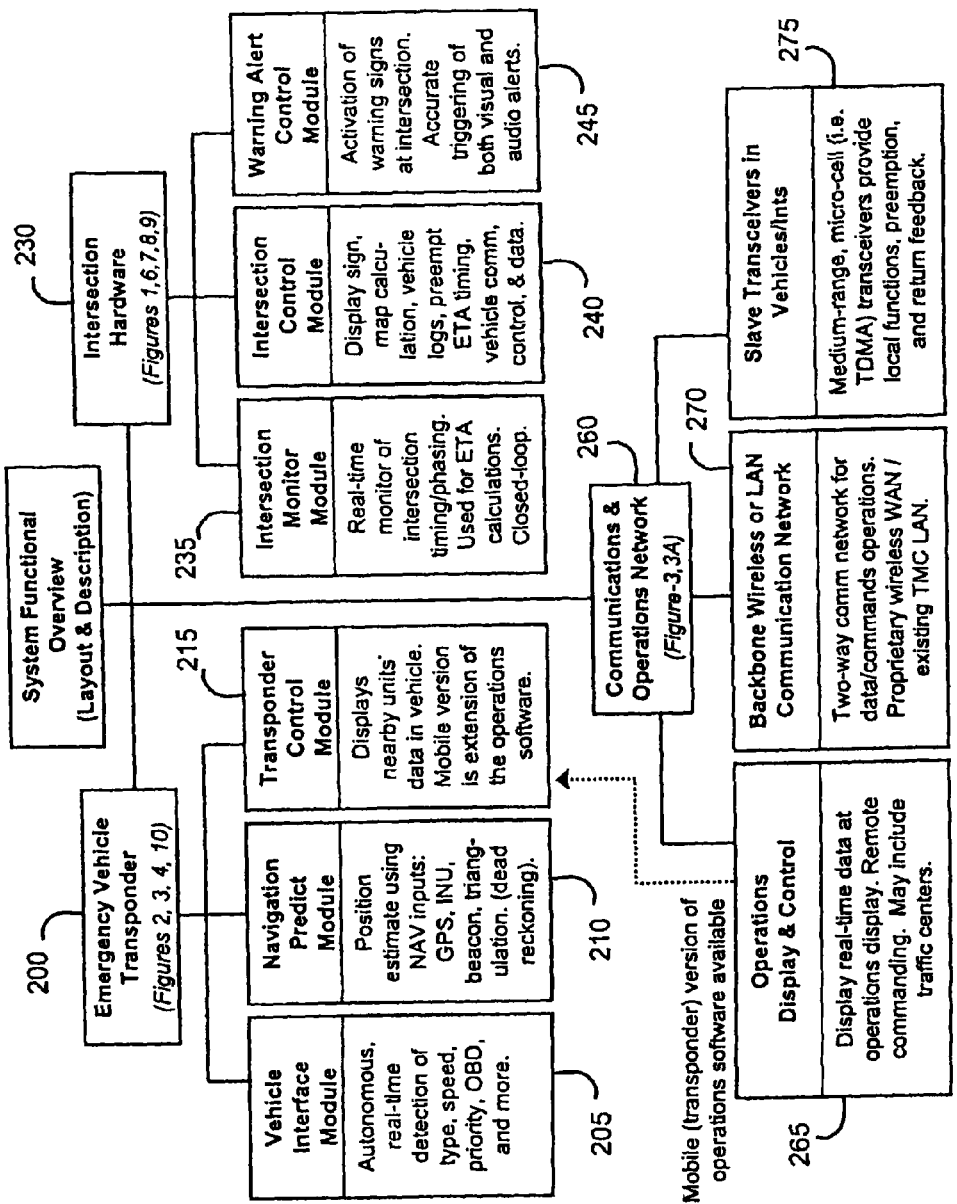
FIG. 5 is a functional organizational diagram of the three major subsystems for the preemption system.

The three major subsystems in the emergency vehicle traffic signal preemption system are shown in FIG. 5: the vehicle transponder 200, the intersection hardware 230, and the communications and operations network 260.

The vehicle transponder 200 is composed of three main components. First, the vehicle computer interface module 205 includes the on-board diagnostics circuit and the emergency priority code interface. Second, the navigation predict module 210 uses navigation sensors such as GPS and INU (inertial NAV unit) sensors to generate both absolute and estimated dead reckoning position reports. Third, the transponder control module 215 provides an interface to the e-operator via LEDs, PC display, or PDA device.

The intersection hardware 230 is composed of three main components. First, the intersection monitor module 235 provides real-time reading and logging of controller signal and pedestrian phasing and timing. Second, the intersection control module 240 performs ETA calculations using vehicle positions and local known mapping topology (commonly known as map-matching). This module also tracks and logs vehicles, actuates and verifies preempt signals, manages communications between other networked units, and manages remotely-generated intersection configuration commands. Third, the warning alerts control module 245 actuates intersection-based visual and/or audio warnings. This module also ensures that warning alerts follow specific rules and timing parameters that govern the sequencing of warning signs with traffic lights.

The communications and operations network 260 is composed of three main components. First, the slave (end-unit) transceivers in vehicles and intersections 275 relay the core preemption status and configuration data to the backbone network. Second, the backbone wireless or LAN network 270 is a hybrid wide-area network designed to route data between mobile wireless vehicles, hard-lined and isolated wireless intersections, and the central operation center(s). Third, the operations software 265 provides for display of all real-time data generated by the intersections and vehicles including positions/speed, phasing, preemption-status, vehicle diagnostics, logged information, configuration data, and many other data parameters. This display/control software 265 can be mobilized for use in any management center, staging area, or even an entire fleet of emergency vehicles.

Figure 1:
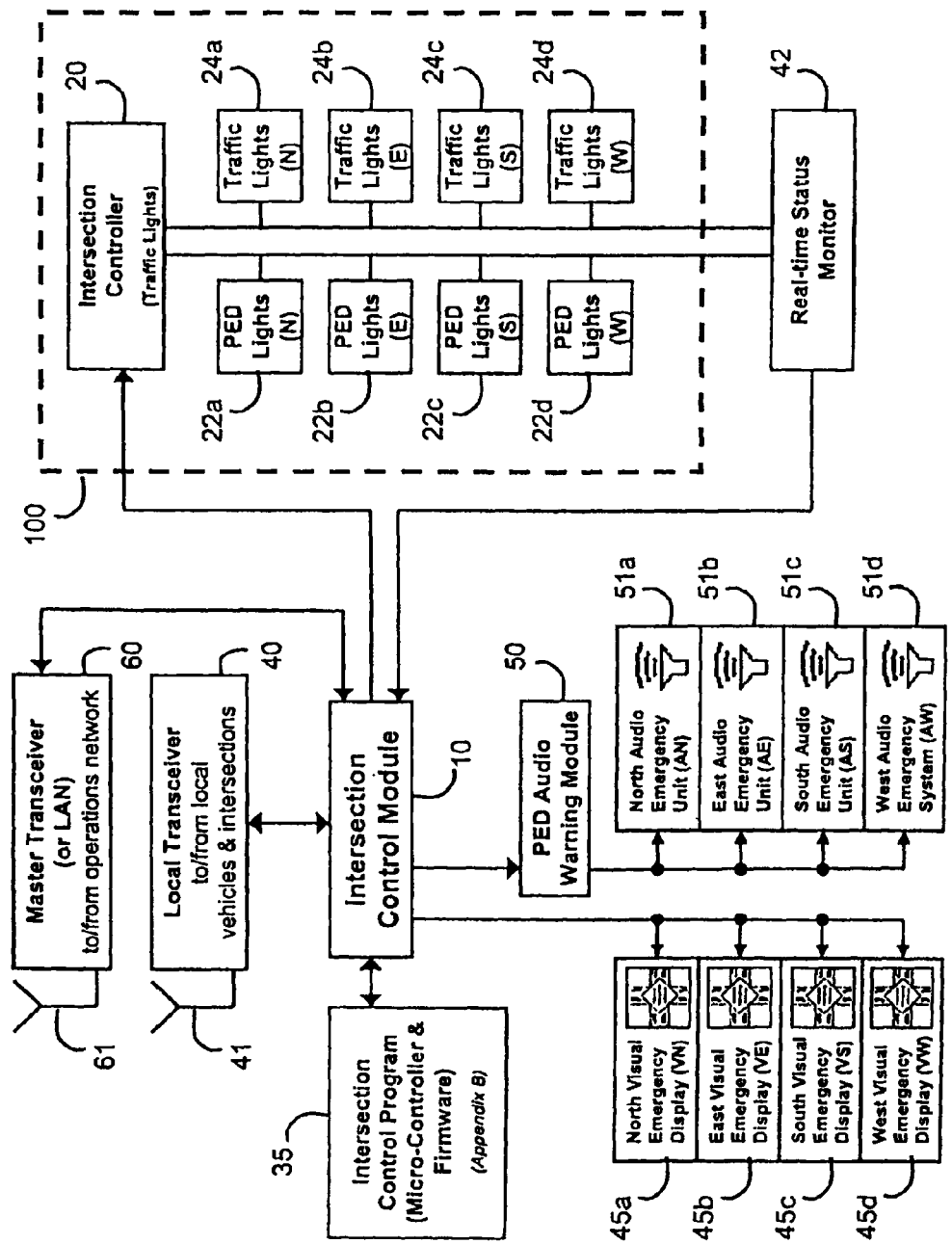
FIG. 1 is a block diagram of the functions of intersection hardware for the emergency vehicle traffic signal preemption system (herein referred to as "preemption system"), as used for interfacing with all intersection controllers.
Figure 2:
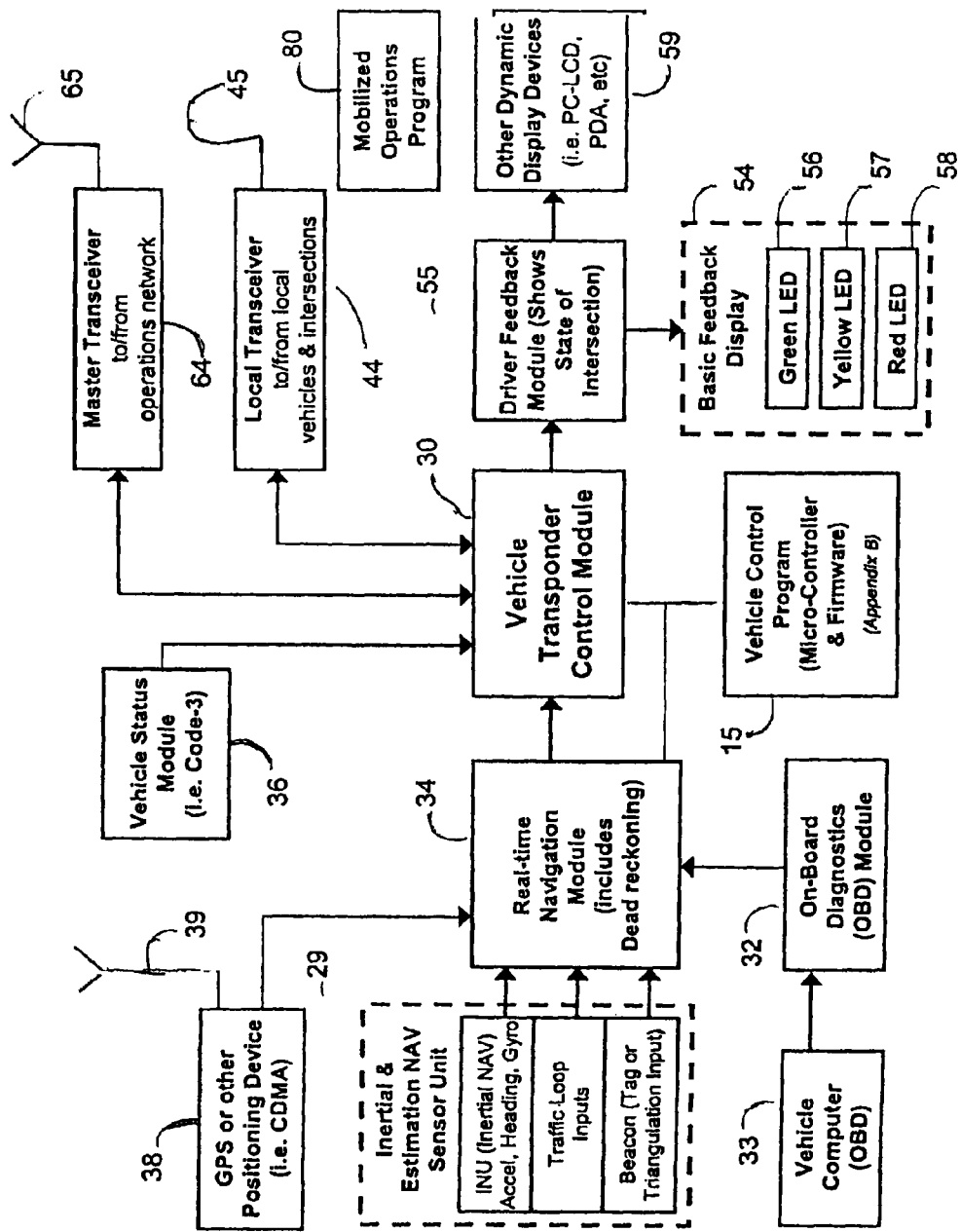
FIG. 2 is a block diagram of the functions in an emergency vehicle transponder for the preemption system.
Figure 13:
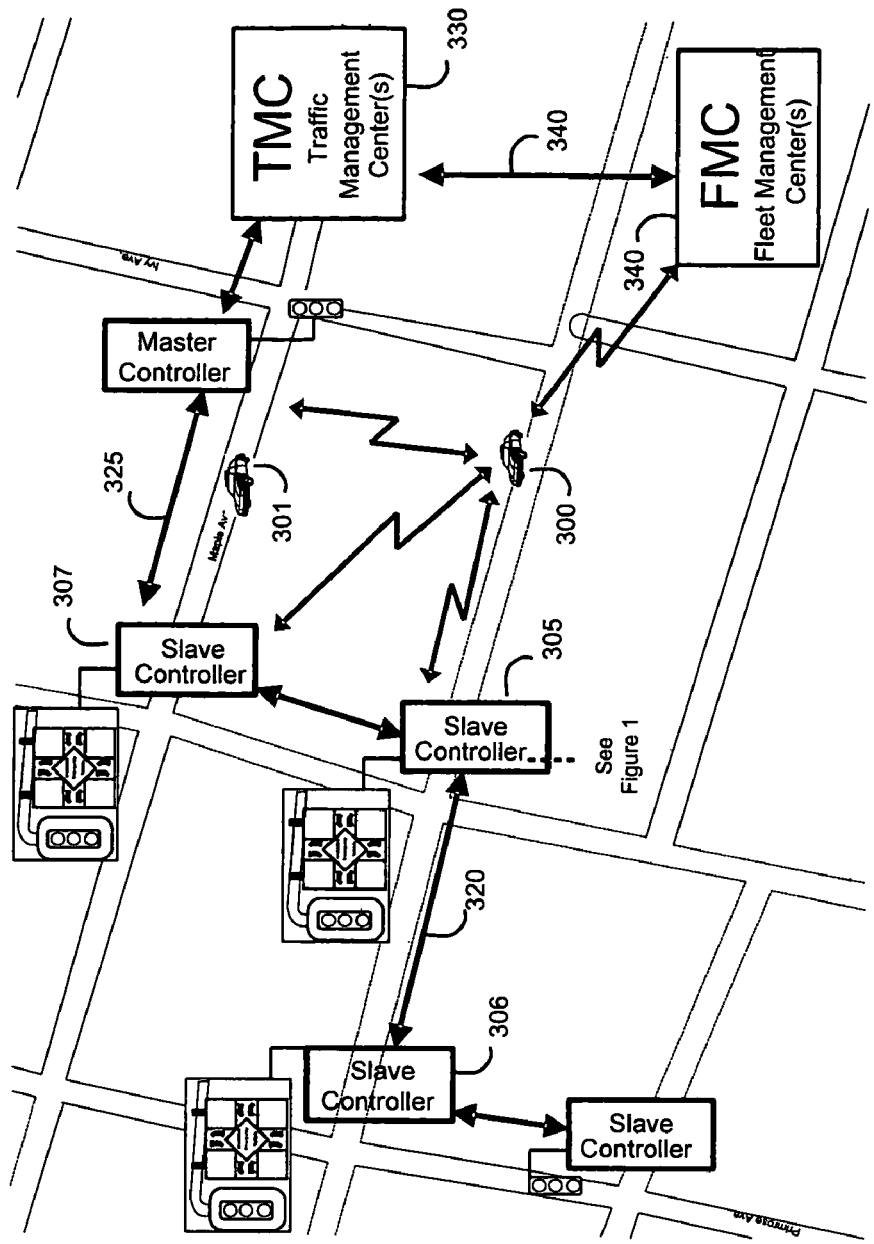
FIG. 13 is a layout and topology diagram of the communications and operations network for the preemption system.

The functional details of the major subsystems in the emergency vehicle traffic signal preemption system are illustrated in the block diagrams of FIG. 1, FIG. 2, and FIG. 13. FIG. 1 illustrates the functional details of the system at each intersection, FIG. 2 illustrates the functions of the system installed in an emergency vehicle, and FIG. 13 illustrates the topology and display/control software used for the communications and operations network.

Traffic light control system 100 at an intersection includes traffic light controller 20 (housed in cabinet 500) that generates the appropriate sequence of on-time and off-time for the various traffic lights that controls vehicular and pedestrian traffic at an intersection. Traffic light controller 20 also has the capability to be forced by external signals into a mode that activates "green" lights in a specified direction and "red" lights in all other directions, allowing safe passage for emergency vehicles from the "green" direction. Controller 20 is preferably a micro-processing circuit driving isolated lamp drivers but discrete designs are also feasible. Some intersections may be more complicated, controlling turn lanes with arrow lights, but the basic principles remain the same.

An example of an intersection being controlled by the system and functions disclosed and describe herein is shown in FIG. 1 of U.S. Pat. No. 4,704,610 referred to hereinabove and incorporated herein by reference. This figure shows the signage and approach of emergency vehicles being controlled. The only feature missing is the pedestrian control signs at each corner which are an added feature of the invention disclosed and described herein.

Traffic light controller 20 generates signals to control pedestrian lights 22a, 22b, 22c, and 22d and also controls the operation of traffic lights 24a, 24b, 24c, and 24d. An intersection having traffic lights can be connected to a system using the emergency vehicle preemption system by addition of the functions described hereinafter without the need to rebuild an existing installation.

The heart of the additional equipment is the intersection control module, a microprocessor 515 (e.g., a ZWorld LP 3100 CPU) operated by proprietary control program software 35. Controller 10 (housed in hardware module 510) receives information from emergency vehicles that approach an intersection via wireless RF transceiver 40 and antenna 41. This information contains data about the predicted position, heading, other navigation data of the emergency vehicle, and its priority-code status 36 (i.e. Code-3, Code-2, or other) thus notifying the intersection of its relative location.

Figure 9:
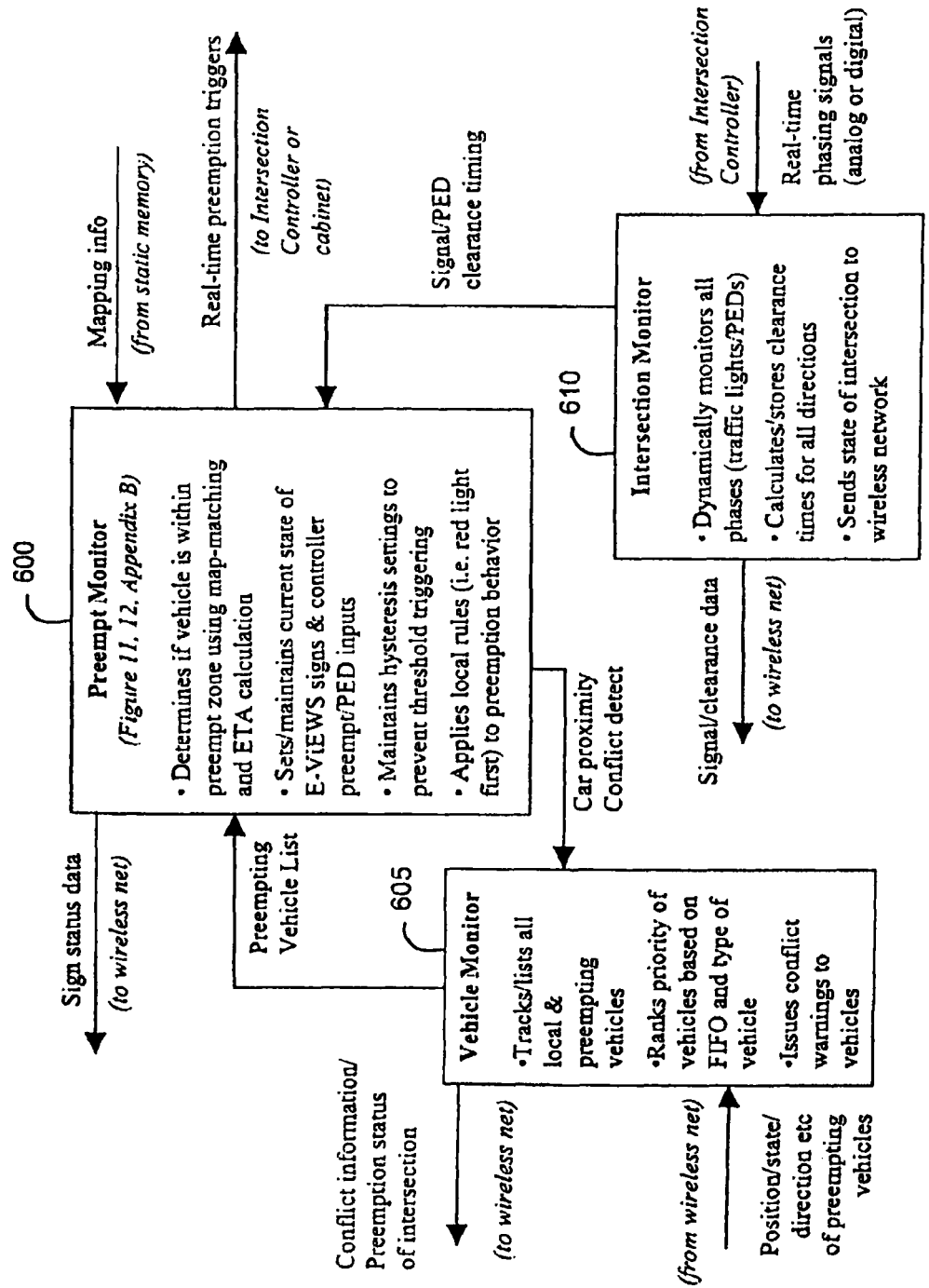
FIG. 9 is a general flow diagram of the intersection control program software for the preemption system.

FIG. 9 illustrates the general functionality of the intersection control program software and firmware 35 (see Appendix B). The vehicle monitor software task 605 running on the intersection CPU 515 tracks all local vehicles and maintains a log of all activity. The task also sends conflict detection warnings, when appropriate, to the vehicles.

Figure 11:
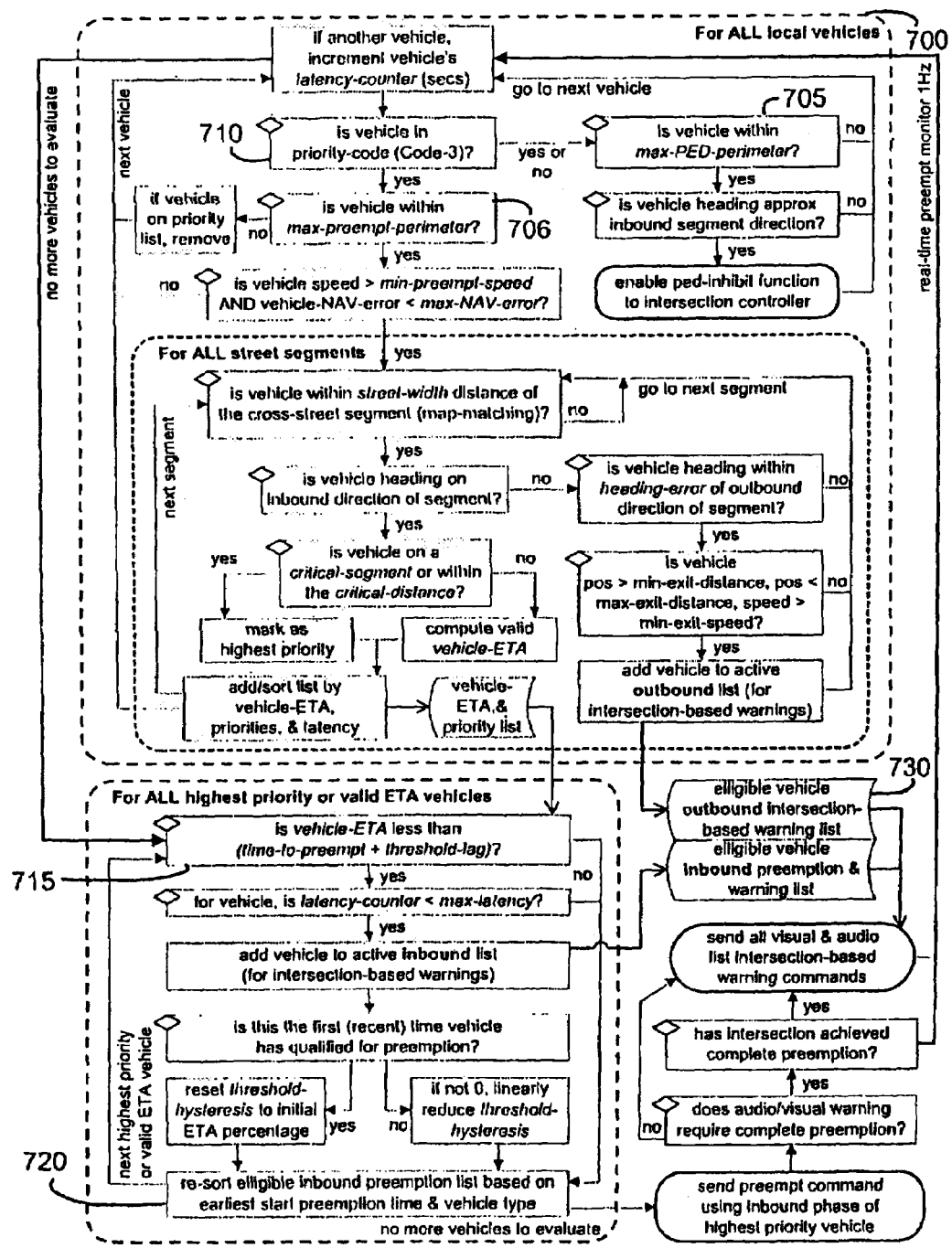
FIG. 11 is a detailed decision flow diagram of the preempt monitor task component for the intersection control program software.

The intersection control program 35 continually evaluates its preemption rules as vehicle updates are received. Position and priority parameters of each vehicle within range are analyzed by the intersection preempt monitor software task 600. The primary decision logic of this task is illustrated in FIG. 11. Appendix A provides detailed explanations of the terms and parameters used in this figure and the description below. The preempt monitor task uses map-matching techniques to evaluate all vehicles against all eligible cross street segments 700 to determine which vehicles are inbound or outbound 730 from the intersection. The task assigns preemption priority to that vehicle which is within critical perimeter zones (pedestrian 705 and preempt 706), in high priority priority-code 710, and is a valid vehicle type 720. In order to optimize the preemption process, it compares the minimum vehicle-ETA with both the intersection clearance time (time-to-preempt) and a minimum complete-preemption time (threshold) 715.

Figure 12:
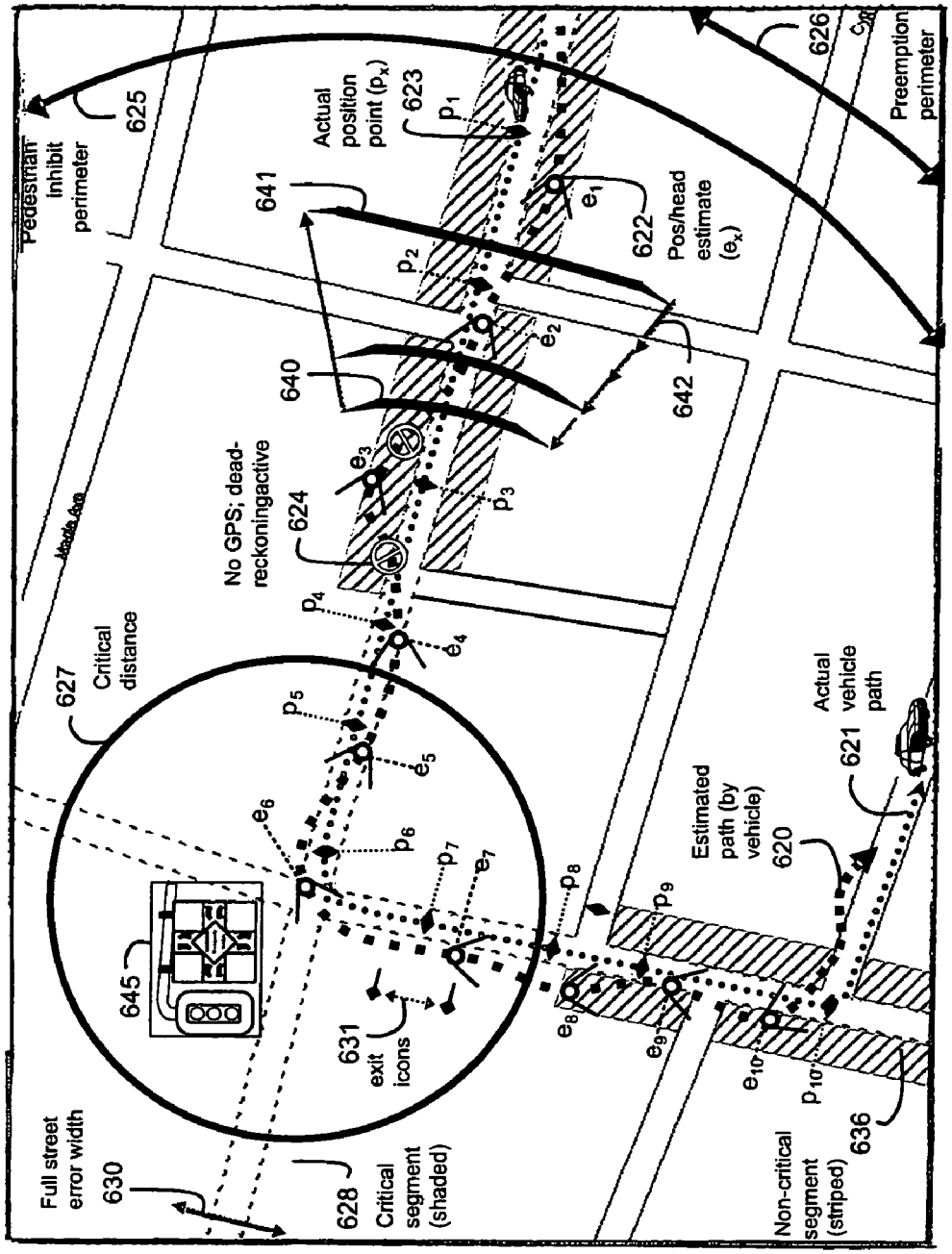
FIG. 12 is a detailed time sequence diagram of the standard preemption criteria used by the intersection control program software in a typical preemption scenario.

FIG. 12 provides a visual illustration of the logic of the intersection preempt monitor software task. The diagram shows the actual positions ($p_\#$) based in time along the actual path 621 of the vehicle. For every actual position ($p_\#$), there is a same-time position report ($e_\#$) along the estimated path 620 of the vehicle. For instance, $p_1$ 623 and $e_1$ 622 both occur at same time $t_1$. The diagram illustrates the estimate path 620 with valid position-lock (i.e. GPS occlusion), as well as temporary loss of position-lock 624 when dead reckoning is used to compensate. The diagram also illustrates the multiple uses of proximity (perimeter) layers, with a pedestrian-inhibit perimeter 625 ("max-PED-perimeter"), a preemption-allowed perimeter 626 ("max-preempt-perimeter"), a critical distance perimeter 627, and multiple critical distance street segments 628. Non-critical segments 636 are also shown (these street segments require additional evaluation based on vehicle-ETA). The exit window 631 displays an example exit distance range where egress intersection-based warnings are allowed to be activated (based on configurable minimum and maximum exit distance criteria). Also, the evaluation of vehicle heading compared against the road heading is shown as the direction-error 622. The acceptable deviation of the estimated position from the center-line of the street 630 is also shown.

FIG. 12 also shows one of the more advanced preemption techniques used on the intersection control program, the use of "threshold-lag" 640, 641, and 642. "Threshold-lag" is defined in Appendix-A. In simple terms it is percentage error factor added to the threshold that gives the "benefit-of-the-doubt" to any actively preempting vehicle. Initially (prior to preemption), the threshold-lag factor 640 is zero percent (0%). When the threshold is crossed, the threshold-lag becomes its maximum value (i.e. 30%), and it is added to both the threshold-time and the time-to-preempt factors for comparison to vehicle-ETA. Once a vehicle has crossed the threshold, and the threshold-lag has been expanded, the threshold-lag linearly decreases back to zero percent (0%) over a small period (i.e. 10 seconds). This calculation is just one form of hysteresis (historical dependence) techniques used in the invention.

Figure 6:
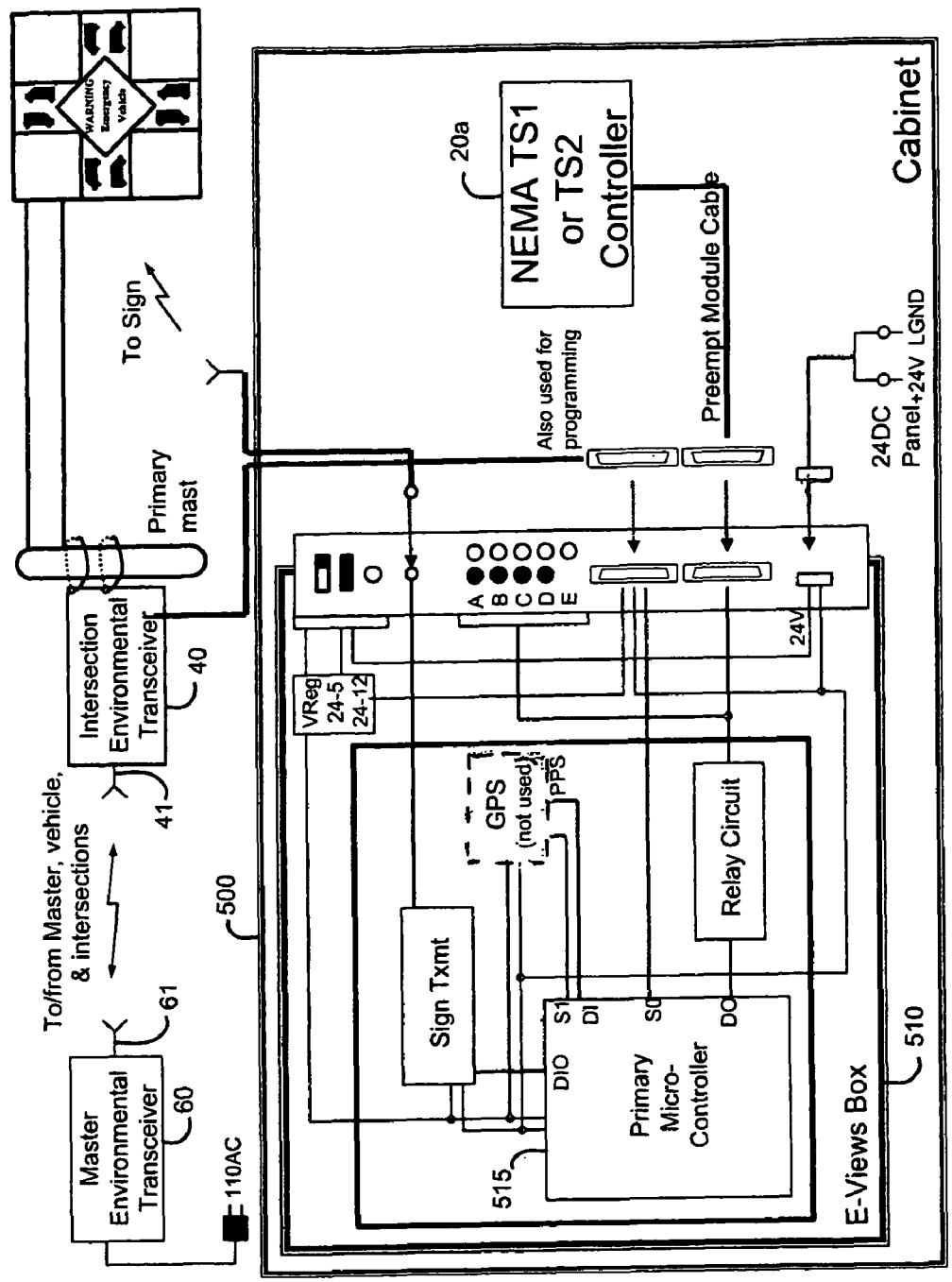
FIG. 6 is a schematic block diagram of the intersection hardware for the preemption system, as configured for interfacing to an intersection controller without monitoring.
Figure 7:
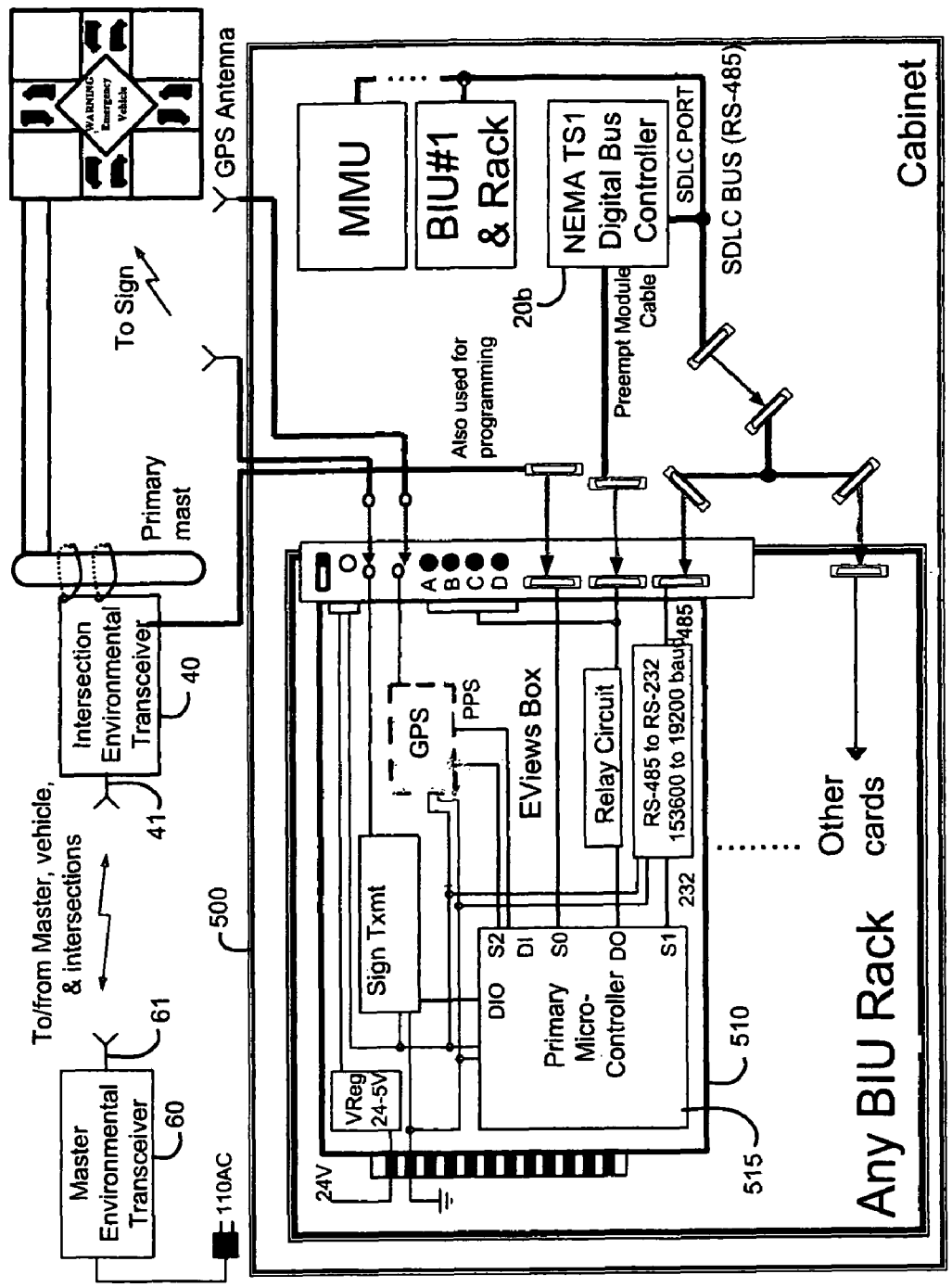
FIG. 7 is a schematic block diagram of the intersection hardware for the preemption system, as configured for interfacing to an intersection controller with digital BUS monitoring.
Figure 8:
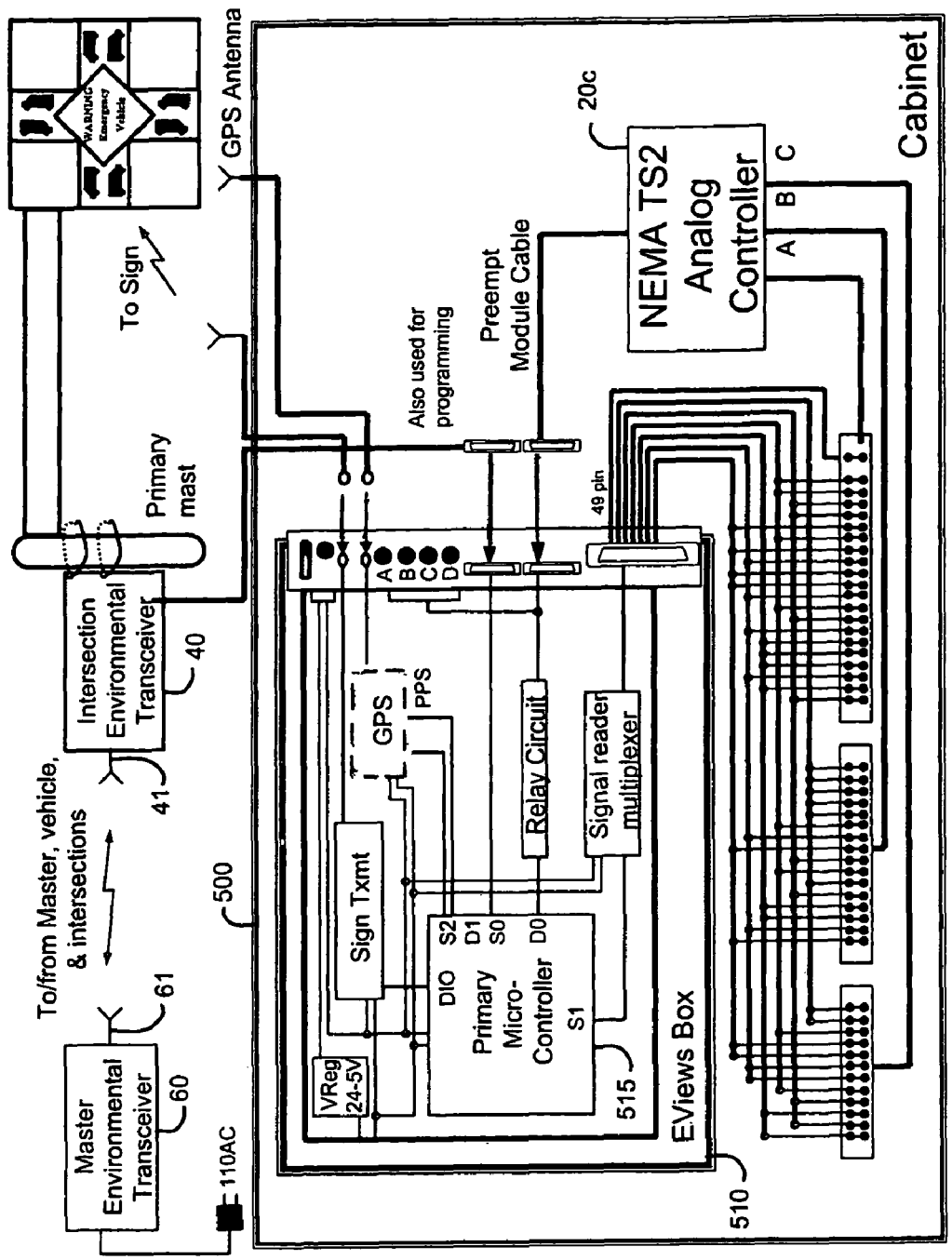
FIG. 8 is a schematic block diagram of the intersection hardware for the preemption system, as configured for interfacing to an intersection controller with analog monitoring.

FIGS. 6, 7 and 8 are schematics that show detailed layouts of the intersection hardware components and, most specifically, multiple configurations for real-time monitoring of phasing/timing controller signals. The configuration in FIG. 7 provides for interfacing to digital BUS intersection controllers 20*b* (such as NEMA TS1 controller models). The configuration in FIG. 8 provides for interfacing to analog-based intersection controllers 20*c* (such as type 170 controller models). On such analog systems, traffic lights signals are monitored by a fail-safe, isolated, high impedance tap and subsequent digital circuit processing. The monitor data is available for remote monitoring via the wide area communications and operations network. As shown in FIG. 6, the system is still compatible with controllers that disable monitoring 20*a* or where monitoring is not desired.

Real-time monitor information is read and analyzed by the intersection monitor software task 610. These calculated values are forwarded to the preempt monitor 600, where these intersection phasing values are integrated with real-time vehicle information. The software attempts to optimize preempt triggers with "time-to-preempt" calculations and "time-to-pedestrian-inhibit" calculations, as compared to the ETA of all approaching emergency vehicles. The goal is to provide minimal disruption to the nominal controller behavior and to maximize the throughput of emergency vehicles through the preemption intersection network. Also, unlike other preemption systems, beyond simply sending a preempt command (actuating a preempt signal), the real-time monitor independently measures the state of the controller-actuated traffic light signals. This provides a critical closed-loop design: it assures that preempt commands are actually executed.

Real-time status monitor 42 is unique because it verifies the state of the traffic signals and sends the intersection status (i.e. "intersection preempted", "conflict detected", or "no preemption") to intersection control module 10. That is, real-time status monitor receives (i.e., "reads") the output from traffic light controller 20 and pedestrian lights 22*a* through 22*d* and traffic lights 24*a* through 24*d* and transmits that information to intersection control module 10. Intersection control module 10 in turn relays that information to emergency vehicles via wireless RF transceiver 40 and antenna 41. Intersection control module 10 now sends signals to emergency display panels 45*a*, 45*b*, 45*c*, and 45*d* to light and flash large emergency signs with the proper icons at each corner of an intersection showing the position of any approaching emergency vehicle relative to the traffic lanes of the intersection as shown and described in the above-identified U.S. patent incorporated herein. The display panels 45*a*-45*d* and proper icons used at each corner of an intersection are shown in FIG. 2 of the U.S. patent referenced hereinabove. The signage is also illustrated in U.S. Design Pat. No. 305,673, issued Jan. 23, 1990, and also incorporated herein by reference.

Also, the real-time status monitor 42 provides which is transmitted via RF master transceiver (or LAN) 60 and antenna 61 to a central monitoring system such as a dispatcher's office. Reciprocally, the intersection receives information on the state of its neighboring intersections. This closed-loop architecture allows various units in the network to accurately predict future movement, log critical information, and notify users of the system state.

The intersection control program 35 (specifically the preempt monitor software task 600) uses map-matching techniques to compare vehicle navigation and position estimates with the approach paths (cross-streets stored locally as map vectors). This way the intersection can determine if any vehicle is on an inbound course towards the intersection by "snapping" it to the closest street. As an example, one of the calculations is the "critical distance" test. This evaluates whether an approaching car has statistically committed itself to crossing through the local intersection based on lack of turning options. Because of the knowledge of the road map, the intersection can preempt even when the "critical distance" is not line-of-sight. As an additional example, in the event that any vehicle comes with a "warning distance" of the intersection (1000-ft commonly used), the control program 35 will actuate pedestrian-inhibit functions. Pedestrian lights 22*a* through 22*d* are changed to prevent pedestrian traffic. Through a combination of hysteresis-based (historical dependence) algorithms and dynamic proximity "windows", the system is able to optimally route emergency vehicles across the map grid. It is also able to effectively mitigate lossy communications, lossy navigation data, and other unpredictable delays in the system.

Another improvement to the system is the provision of an audio warning to pedestrians. Thus simultaneously with controlling the lights and pedestrian flashing signals, controller 10 generates an audio message to be delivered from audio warning device 50 to speakers 51*a* through 51*d*.

As mentioned, the details of the software in the intersection control program for implementing the functions of the system are provided in Appendix B. Because the functions controlled are described in great detail in the text, many software solutions to implement the functions will be apparent to those skilled in the art.

Emergency vehicle functions for the preemption system are illustrated in the block diagram of FIG. 2. A transponder box 99 (and cables 98, 98*a*) are installed in each emergency vehicle and provide the functions that facilitate communication with preempt-able intersections, other emergency vehicles, and also central monitoring stations such as a dispatching center. Inputs and outputs to and from the emergency vehicle system are handled by transponder control module 30 under the direction of proprietary control program software 15. Vehicle parameters are determined from several inputs provided to transponder control module 30.

Vehicle position is available from GPS receiver 38 via antenna 39. Several positioning inputs 96 are available from ports in navigation input device 34. Optional alternative inputs from ports and navigation input device 34 are INU (inertial navigation and estimation unit 29) parameters including accelerometers, gyroscopes, wheel-tachometers, and heading indicators. Other inputs include ID tag tracking, beacon triangulation, modified traffic loop detectors, and others. Vehicle information such as speed and acceleration are read in real-time from the vehicle computer 33 using the on-board diagnostic (OBD) interface cable and connector 33a. These signals are converted and verified by the OBD circuit board 32 and the translated digital signals are input to transponder control module 30 (embedded on a micro-controller 97).

The emergency vehicle transponder system communicates with intersections via wireless RF transceiver 44 and antenna 45. The vehicles and intersections software task 670 running on the vehicle transponder handles incoming intersection preempt alerts and vehicle position reports from nearby units. It receives feedback verification and displays the information on-board by activating one or more LEDs 56, 57, or 58 on the LED display 54. If it receives a signal for safe passage through an intersection, "green" LED 56 is illuminated. If another high-priority emergency vehicle is concurrently trying to preempt the same intersection, "yellow" LED 57 is illuminated. Illumination of "red" LED 58 indicates that there is no preemption at the intersection. LEDs 56 through 58 are driven by "intersection preempted" logic circuit 55. Logic circuit 55 can also provide customized outputs to dynamic display devices 59, such as PC monitor displays (LCD's) and Personal Digital Assistants (PDA's). Such devices are commonly used for law enforcement applications within the vehicle. As mentioned, the operations software shown in FIG. 14 can be mobilized 80 and run on any vehicle-based auxiliary hardware device with a standard operating system. The vehicle interface software task 665 in the transponder control program allows advanced mapping and alerting of active nearby intersections and vehicles.

Emergency vehicle status is available in real time via master RF transceiver 64 and antenna 65 to a central monitoring station. Thus the position of any vehicle as well as the status at an intersection is always available at some centrally located dispatch station.

As indicated previously, the software in control program 15 to implement the functions of the transponder described above has many possible solutions. Thus the software provided to control the operation of transponder control module 30 can be designed and implemented by anyone skilled in the art given the detailed explanation of the system and functions described hereinabove. Also, as previously mentioned, Appendix B provides detailed pseudo-code of a full-featured version of the software for both the intersection and vehicle.

Figure 3:
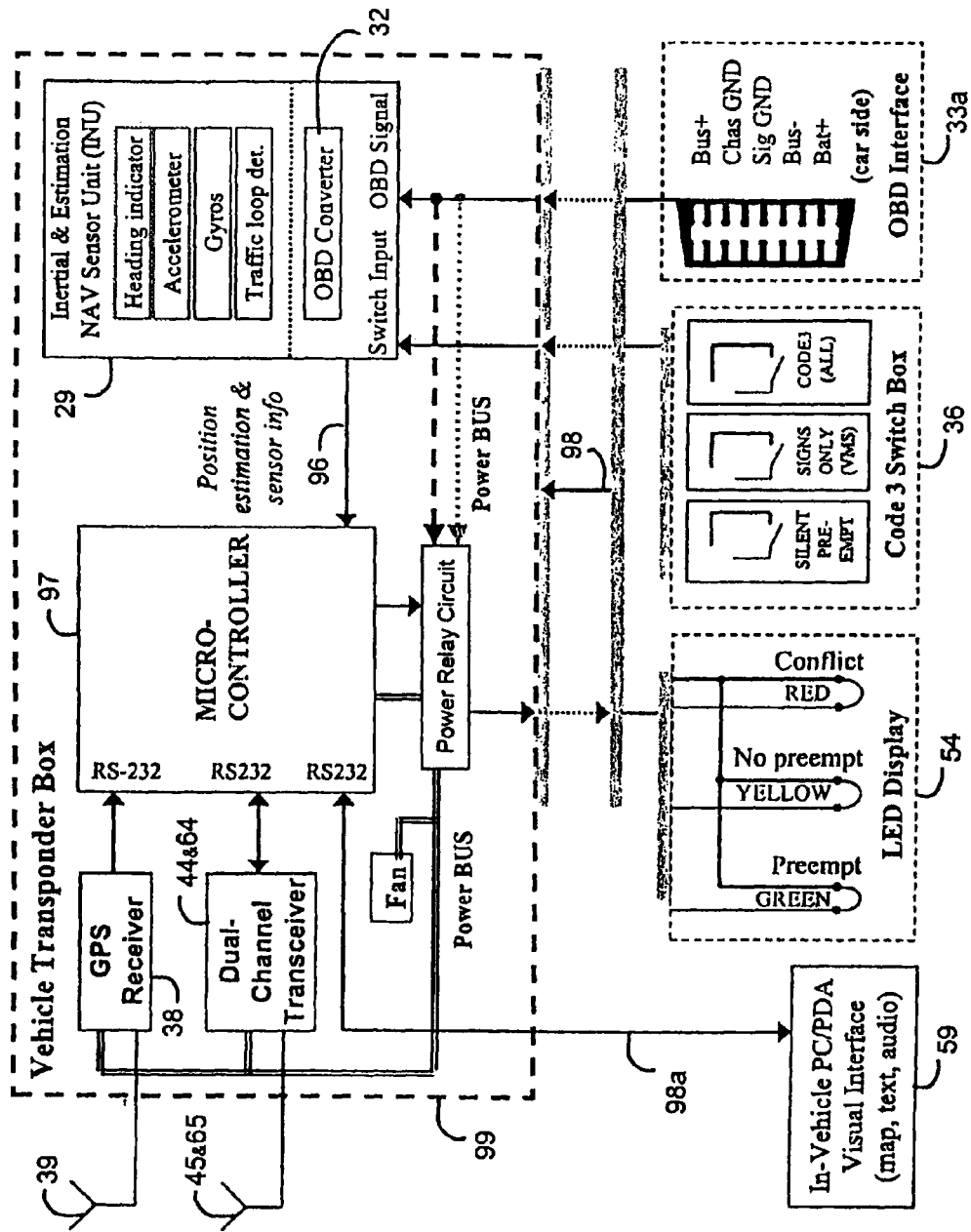
FIG. 3 is an example schematic block diagram of a standard vehicle transponder for the preemption system.

FIG. 3 is a schematic block diagram of the transponder system mounted in each vehicle. The transponder box 99 in the vehicle receives power from car battery through the OBD interface 33a. The transponder box 99 has a GPS receiver such as that produced and manufactured by Garmin International Incorporated. The transceiver can be a radio transceiver produced and manufactured by Freewave Technologies of Boulder, Colo.

Figure 4:
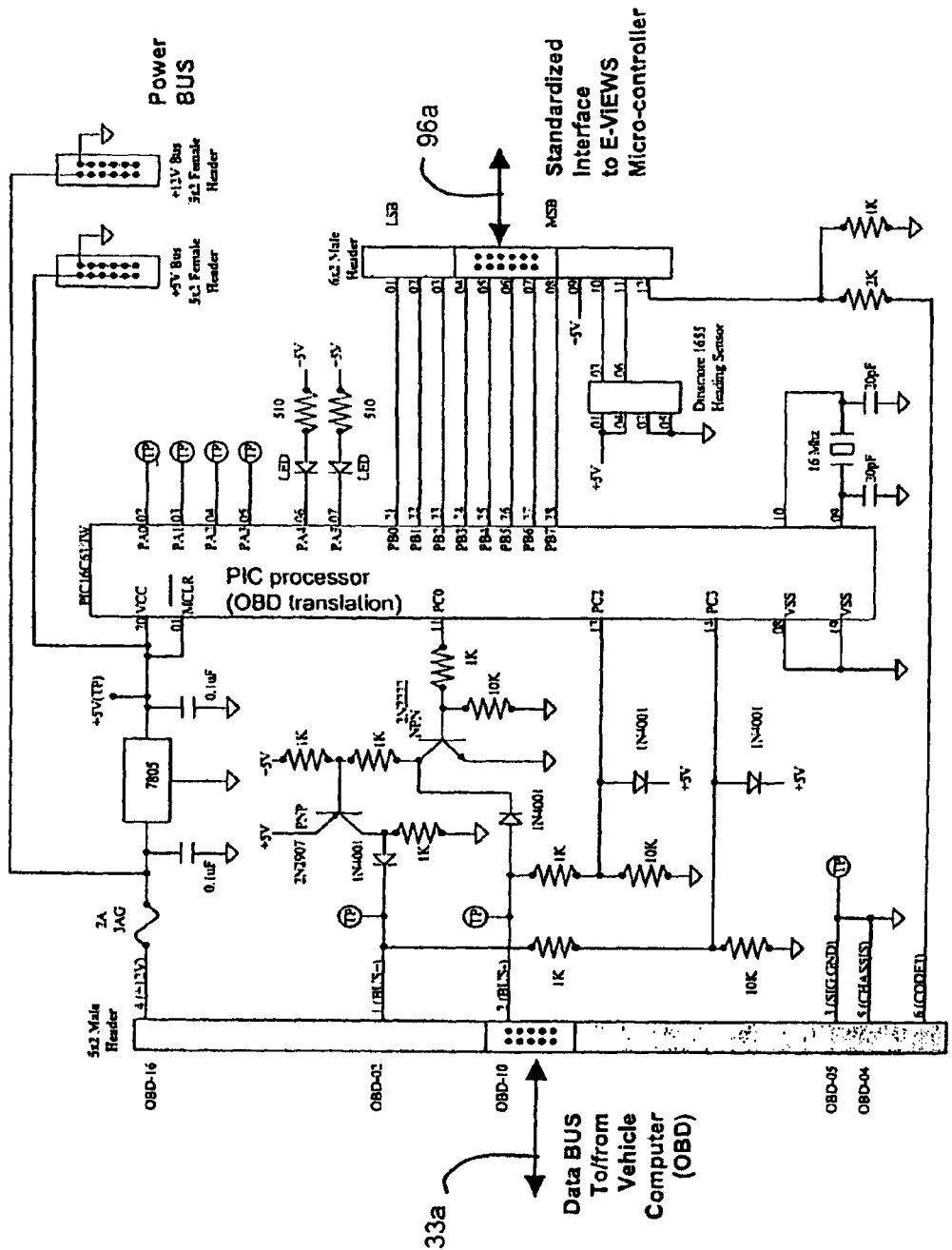
FIG. 4 is an example schematic diagram of a vehicle on-board diagnostic (OBD) circuit for the preemption system.

FIG. 4 is a schematic diagram of the on-board diagnostic (OBD) circuit for the vehicle-based electronics and transponder. The on-board diagnostic circuit handles such information as speed, acceleration, heading, ignition status, etc. and generates the proper digital signals 96a for delivery to transponder control module 30.

Figure 10:
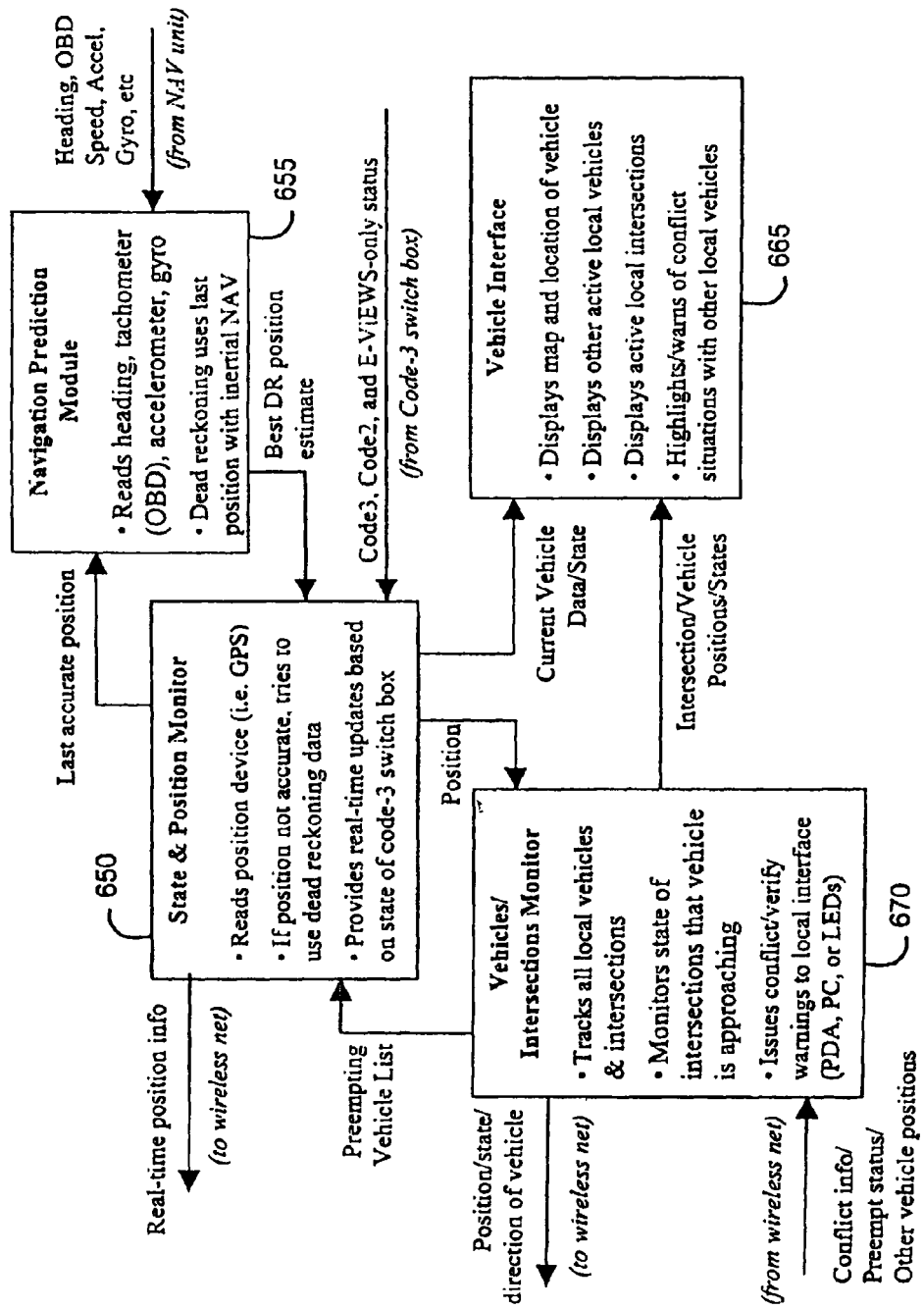
FIG. 10 is a general flow diagram of the vehicle transponder control program software for the preemption system.

FIG. 10 illustrates the general functionality of the vehicle transponder control program software and firmware. The program monitors and logs all in-range vehicles and intersections and manages the data output to the operator display. The core component of the transponder software is the navigation prediction module software task 655. The task uses position estimates by GPS and other absolute position inputs, and combines data from accelerometers, gyroscopes, tachometers, and heading indicators. This data is then integrated with historical logs. This process, commonly known as dead reckoning, uses accurate (yet possibly intermittent) position reports integrated with time-based inertial navigation data to generate enhanced position estimates. Position information is forwarded to the transponder state and position monitor software task 650. This task monitors vehicle state and diagnostic inputs (such as Code-3) and generates position/state reports to broadcast via the wireless network.

FIG. 13 illustrates an example network topology for the communications and operations network. Emergency vehicles 300 and 301 send navigation reports (i.e. GPS) and other data/commands (via wireless connection) to/from intersections and other local vehicles. Preemption-equipped intersections 305, 306, and 307 monitor navigation information from vehicles. Intersections cooperatively and redundantly communicate with each other 320 (via wireless or LAN) to enhance data accuracy and ensure robust communications. Data is also passed along to existing TMC (traffic management center) 330 using existing city LAN communications network 325. If a LAN network is not used, wireless systems can be substituted, such as through FMC 340 (fleet management center) systems. From there, FMC can forward all data to/from vehicle and TMC.

Figure 14:
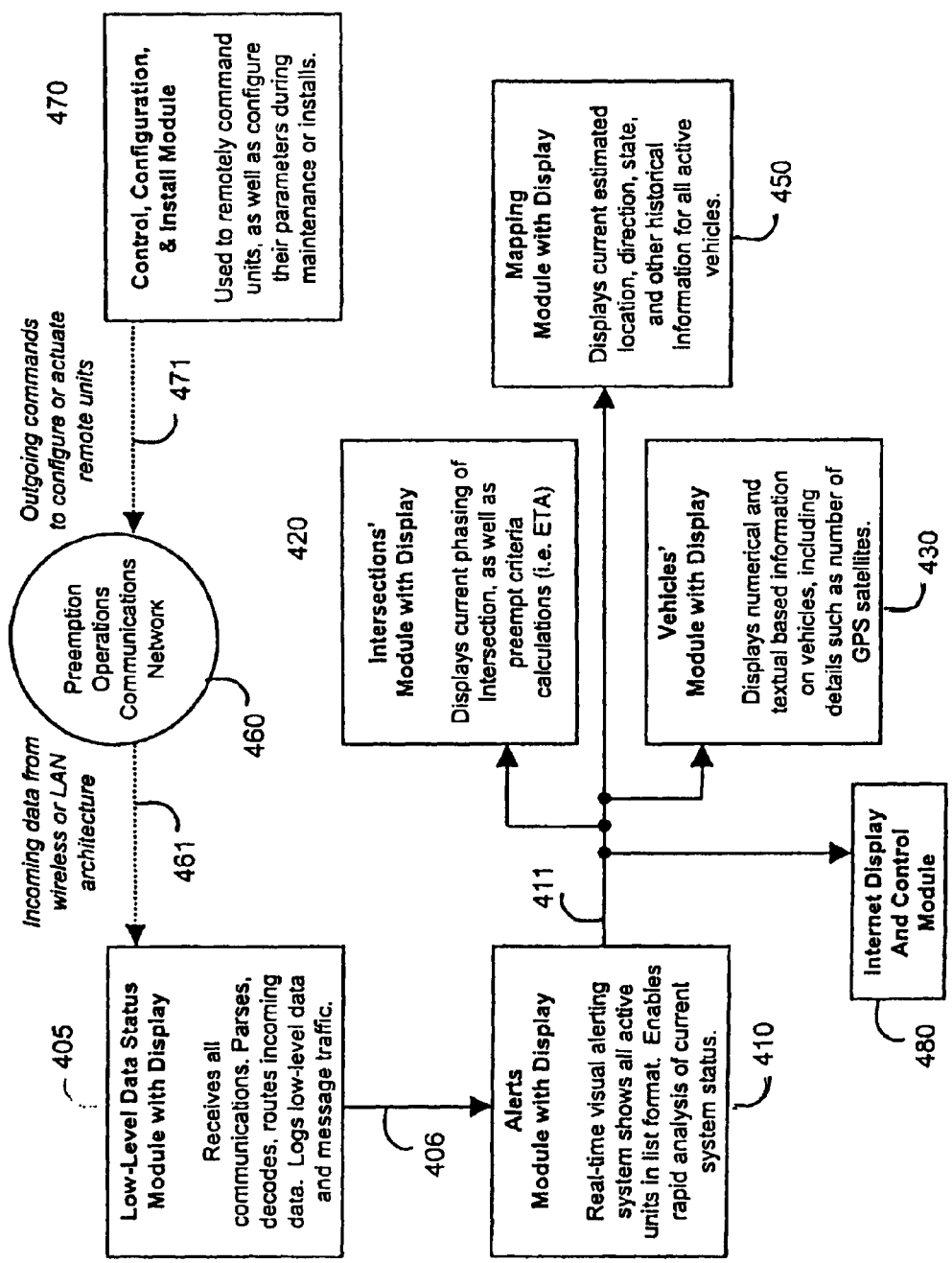
FIG. 14 is a block diagram of the functions and data flow of the operations software for the preemption system.
Figure 15:
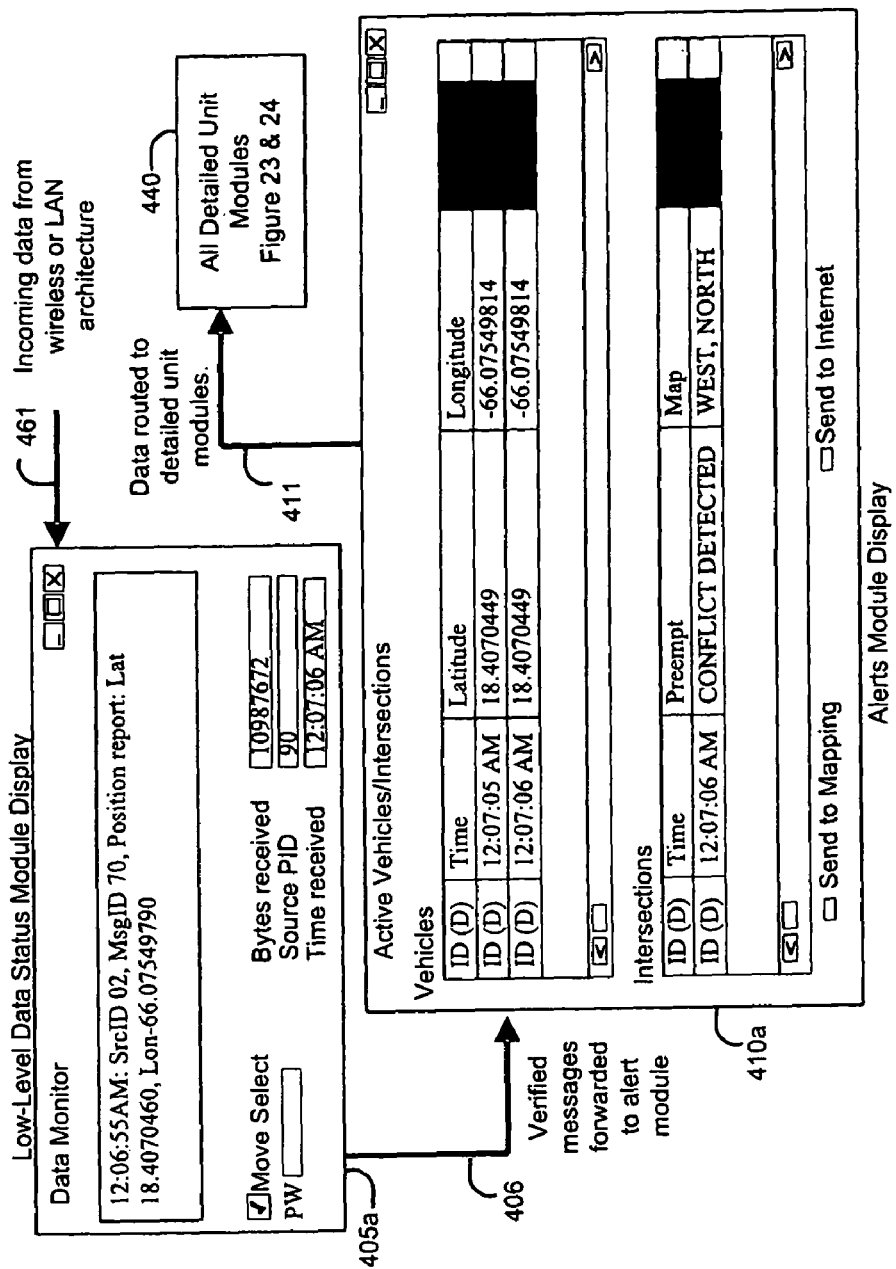
FIG. 15 is an example of the data status module display component and alerts module display component, used in the operations software for the preemption system.
Figure 16:
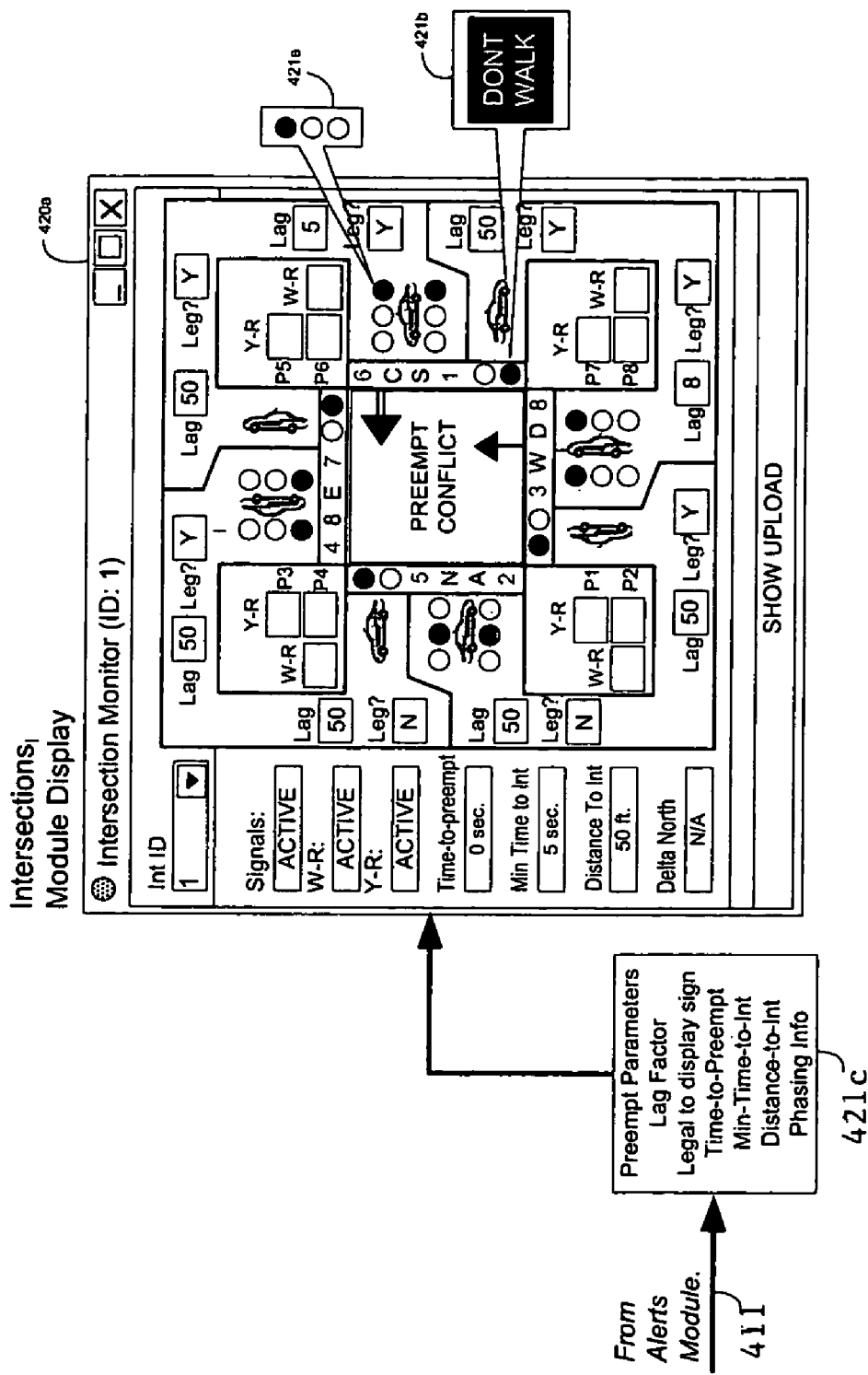
FIG. 16 is an example of the intersections module display component, used in the operations software for the preemption system.
Figure 17:
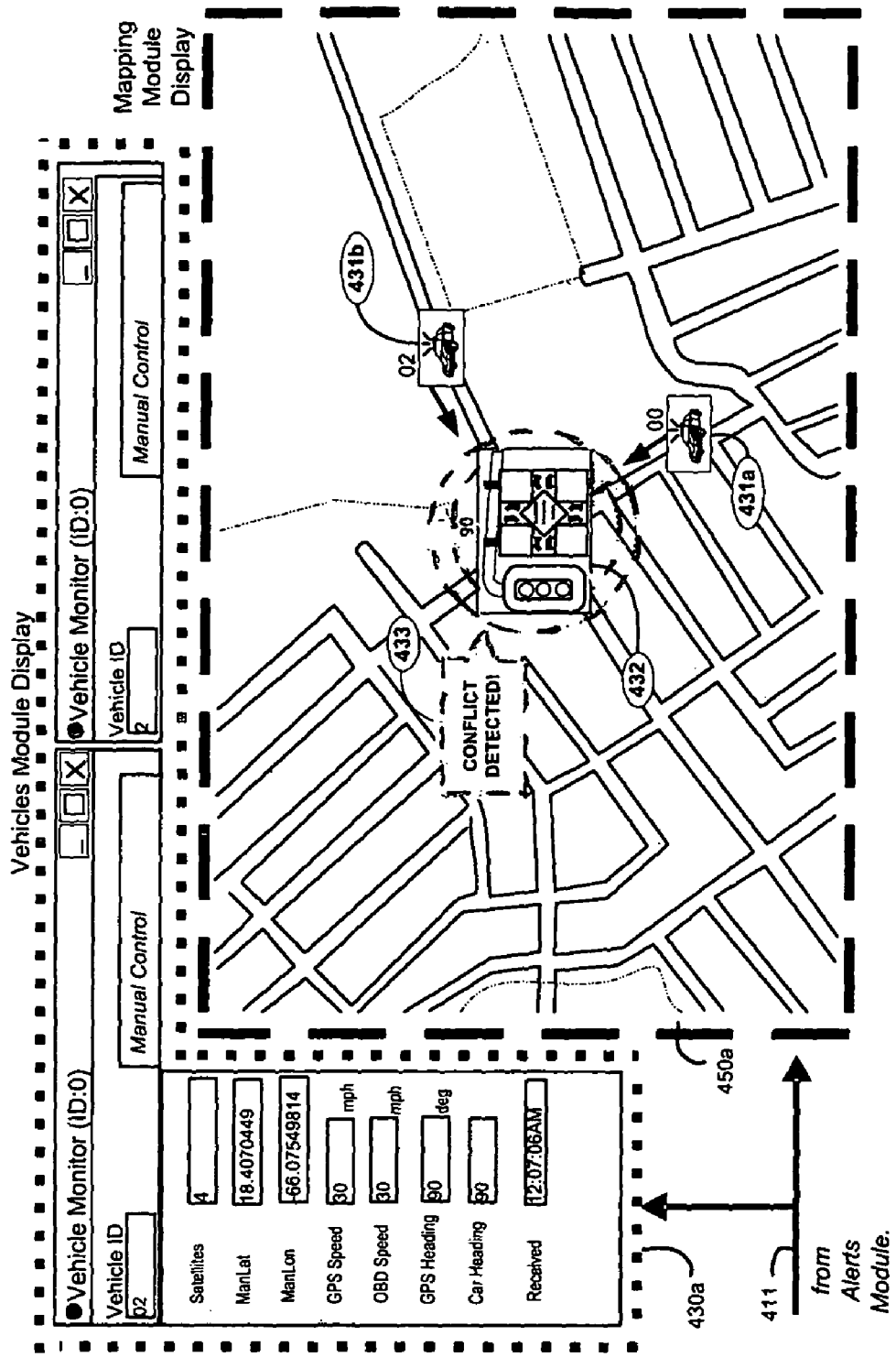
FIG. 17 is an example of the vehicles module display component and the mapping module display component, used in the operations software for the preemption system.

FIG. 14 is a block diagram of the operations software, designed for use in central command centers, mobile command stations, and in individual emergency vehicles. The diagram illustrates the primary functional components of the software. The primary components include algorithmic modules and visual displays for: low-level data activity 405, priority alerts 410, intersections' data 420, vehicles' data 430, and geographic mapping 450. In FIGS. 15, 16, and 17, both data and displays for these components are shown in an example preemption scenario. This example demonstrates the real-time operations monitoring of a conflict detection scenario, whereby two police vehicles are approaching the same intersection in high priority mode. FIG. 15 shows incoming data 461 from vehicles and intersections within the preemption operations communications network 460. Textual status messages are provided on the data status module display 405a. The data status module 405 also maintains a historical record for all low-level communication and data-flow activity. This module 405 relays all verified and priority data messages 406 (i.e. position, preempt, and conflict messages) to the alerts module 410. The alerts module display 410a provides real-time visual notifications of current high-priority events (i.e. active Code-3 vehicles and preempted intersections) and enables rapid analysis of the current preemption system status.

The alerts module 410 forwards all detailed data 411 to the vehicles and intersections modules 420 and 430. The intersection module display 420a shows real-time detailed intersection data including the traffic light states 421a (phasing) and pedestrian clearance states 421b. Also shown are timing parameters 421c (for example, minimum ETA to intersection for inbound direction) and display data (for example, visual warning signs' states). The vehicle module display 430*a* shows real-time detailed vehicle data including estimated locations, car types, priority-states, navigation data (such as heading), and other historical information.

All vehicles' and intersections' active data 411 is integrated and overlaid on the mapping module display 450*a*. The display is an adjustable city map with active units shown as icons, such as vehicle units 431*a*, 431*b* and intersection units 432. Visual high-priority alerts, such as conflict detection warnings 433, are logistically overlaid on the map.

A secondary component of the operations software is used for installation and real-time configuration of units 470 as they are added to the preemption network. For intersections, configuration commands 471 include the upload of street grid databases, phase preemption information, and enter/exit distance and timing. For vehicles, configuration commands 471 include ID tags, selection of vehicle type, and sensitivity settings for navigation algorithms. Various test utilities allow the installer to visually monitor the intersection and approaching test vehicles. For instance, the system can be put into the silent preempt mode (no warning signs), or can be manually activated to preempt without a vehicle. The software can communicate directly with a local intersection or vehicle, or can use the local unit's transceiver to talk to the rest of the network.

The operations software can be used to analyze (and optimize) call response times and call response strategies (routes, etc.). It can be used from any location within the range of the network, and can also be integrated into existing call-response centers. The software can also be used for emergency logistics management (i.e. multiple car responses), preventative warnings (i.e. conflict detection), and can also be integrated into existing TMC incident management systems. The system and displays can be accessed via the internet 480 as well. Traffic technicians can use the system to monitor phasing and optimize internal controller programming to match desired preemption settings and behavior. The monitor software is also able to identify potential problems or conflicts in the network using intelligent "sniffer" software utilities. These algorithms watch incoming data to make sure that data is disseminated in real-time, that data is cohesive and error-free, and that position/state reports are consistent. The system also has the capacity to quickly and autonomously shut off problem vehicle or intersection units. These utilities allow the system to quickly identify anomalies and request maintenance, thereby drastically reducing potentially significant traffic problems.

Thus there has been disclosed improvements to an emergency vehicle traffic signal preemption system. Improvements include providing an autonomous system that is not dependent on intersection being in visual range. The system provides conflict detection and alerts emergency vehicle operators in the area, and provides real-time monitoring of an intersection phase. The real-time monitoring of intersections is indicated by LEDs on a transponder or LCD display in the emergency vehicle that show whether there is a conflict or the intersection being approached is not preempted. The system also includes the improvement of an audio alarm to alert pedestrians who may not be aware of an approaching emergency vehicle for various reasons or are at an angle where visible signs are not clear.

This invention is not to be limited by the embodiment shown in the drawings and described in the description which is given by way of example and not of limitation, but only in accordance with the scope of the appended claims.

APPENDIX A

The following phrases and definitions are used to describe preemption-related terms, operator-configured parameters, and software-derived calculations. These terms specifically relate to (a) the decision flow diagram in FIG. 11, (b) the example preemption scenario shown in FIG. 12, and (c) the decision criteria used in the intersection preempt monitor software task:

GENERAL DEFINITIONS

"Complete preemption" is the state where a preemption command has been sent to an intersection controller, and the command has been completed such that all PED and traffic lights are "red", except the inbound traffic light for a preempting emergency vehicle which is "green".

"Street segment" is a line (vector) that when combined with other contiguous street segments, represent a street map in the intersection control program software. The segments identify all local streets near or crossing the intersection.

"Critical-inbound" refers to an emergency vehicle that is on a cross street segment, inbound based on its heading, and its ETA or proximity make it eligible for preemption. A vehicle in this state, except in special circumstances, would be preempting the intersection.

"Hysteresis" is a historical dependence statistical calculation. It uses behavior or rules formed while collecting previous time-based sequenced data to predict future behavior. In the context of this preemption system, hysteresis is used to address such observations as: "if an e-operator successfully preempts a traffic light, the intersection program should be very conservative and cautious before discontinuing the preemption for that vehicle." This basic hysteresis approach is illustrated in FIGS. 11 and 12. Advanced approaches use tracking and prediction algorithms to more accurately assess vehicle position, e-operator intent, and optimize intersection controller behavior.

Operator-Configurable Values:

"Max-preempt-perimeter" is the maximum distance at which a vehicle is allowed to preempt the local intersection. As example, 3000-ft could be used.

"Street width" is the maximum deviation (distance) allowed between the line-center of a street segment and a vehicle's estimated position. If the calculated difference is less than "street width", the vehicle is considered "on" a street segment. As example, 50-ft could be used.

"Heading error" is the maximum deviation (angle) allowed between the direction of a street segment and a vehicle's estimate heading. If the difference between angles is less than the "heading error", the vehicle is considered to be moving "along" that street segment. As example, 15-degrees could be used.

"Critical distance" is the distance within which a vehicle is automatically marked as critical-inbound (if heading meets criteria). As example, 200-ft could be used.

"Critical segment" is a boolean value that applies to all street segments; if "yes" then any vehicle "on" that street segment is automatically marked as critical-inbound (if heading meets criteria).

"Max-PED-perimeter" is the distance within which pedestrian-inhibit is enabled to prevent standard PED clearance phases. As example, 2200-ft could be used.

"Min-exit-distance" is the minimum outbound distance past which egress intersection-based warnings are allowed. As example, 30-ft could be used.

"Max-exit-distance" is the maximum outbound distance up to which egress intersection-based warnings are allowed. As example, 100-ft could be used.

"Min-exit-speed" is the minimum speed above which outbound intersection-based warnings are allowed. As example, 5-mph could be used.

"Min-preempt-speed" is the minimum speed above which inbound preemption and inbound intersection-based warnings are allowed. As example, 10-mph could be used.

"Max-latency" is the maximum time between preemptable messages (see latency-counter description) from the same vehicle before that vehicle is considered inactive. As example, 6-secs could be used.

Software Derived/Calculated Values:

"Max-NAV-error" is the maximum estimated distance error allowed for vehicle-ETA calculations, as determined by dead reckoning algorithms and positioning device specifications. Any error exceeding this factor will invalidate the associated estimated vehicle position. As example, 150-ft could be used.

"Vehicle-ETA" is the minimum estimated ETA (estimated-time-of-arrival) of a vehicle at an intersection, as calculated using the real-time map distance between vehicle and intersection, vehicle speed, vehicle acceleration (based on historical averaging and vehicle type), street type, and expected street conditions (i.e. time-of-day).

"Threshold-lag" is the minimum estimated time that the complete-preemption state must remain steady prior to a preempting vehicle's arrival at an intersection. This calculation is based on the vehicle's speed. The purpose of this factor is to minimize slowing of preempting vehicle. The lag includes threshold-hysteresis (see below).

"Threshold-hysteresis" is a percentage time error included in threshold-lag. When a vehicle preempts an intersection, the threshold-hysteresis factor resets from 0% to a percentage of the initial vehicle-ETA. For example, 30% could be the default initial setting. Every second thereafter, this percentage is reduced linearly, until 0%. This ensures that once a vehicle is preempting, it is unlikely a temporary vehicle change will disable preemption (i.e. slowing down).

"Time-to-preempt" is the minimum time to achieve complete preemption at an intersection, estimated by the real-time phasing monitor. One of the primary calculations to determine a vehicle's preempt eligibility is if a vehicle's ETA is less than the sum of the time-to-preempt and threshold-lag parameters.

"Latency-counter" is the number of seconds since the last "valid" preempt-able message was received from a given vehicle. Some criteria that would cause the latency counter to increment are: (a) a position report accuracy worse than Max-NAV-error, (b) vehicle not "on" a street segment, (c) low or no vehicle speed, or (d) vehicle heading not inbound.

What is claimed is:

1. An emergency vehicle traffic control system comprising:
   a processor; and
   a memory operably coupled to the processor and having program instructions stored therein, the processor being operable to execute the program instructions, the program instructions including:
      receiving navigation information of an emergency vehicle approaching an intersection equipped with one or more vehicular traffic lights;
      estimating a time of arrival at the intersection based on the navigation information;
      transmitting one or more preempt commands for controlling the vehicular traffic lights based on the estimated time of arrival and current light states of the vehicular traffic lights for providing right of way to the emergency vehicle;
      verifying that the preempt commands have been executed; and
      transmitting a signal to the emergency vehicle based on the verification for activating a visual display in the emergency vehicle indicative of whether the emergency vehicle has right of way through the intersection.

2. The system of claim 1 further comprising:
   a warning alert control module at the intersection for activation of a warning message associated with the approaching emergency vehicle.

3. The system of claim 2, wherein the warning message is a visual alert.

4. The system of claim 2, wherein the warning message is an audio alert.

5. The system of claim 1, wherein the program instructions further include:
   assigning a preemption priority to the emergency vehicle.

6. The system of claim 1, wherein the program instructions further include:
   transmitting a preemption status to the emergency vehicle.

7. The system of claim 1, wherein the navigation information includes emergency vehicle position data.

8. The system of claim 7, wherein the position data is derived from an inertial navigation unit.

9. The system of claim 7, wherein the position data is derived from a global positioning system.

10. The system of claim 1, wherein the controlling includes controlling one or more pedestrian traffic lights based on a time for a pedestrian to cross the intersection.

11. The system of claim 10, wherein the controlling of the pedestrian traffic lights includes inhibiting a pedestrian clearance phase.

12. An emergency vehicle traffic control system comprising:
   a processor; and
   a memory operably coupled to the processor and having program instructions stored therein, the processor being operable to execute the program instructions, the program instructions including:
      receiving navigation information of an emergency vehicle approaching an intersection equipped with one or more vehicular traffic lights and one or more pedestrian traffic lights;
      estimating a time of arrival at the intersection based on the navigation information;
      controlling the vehicular traffic lights and the one or more pedestrian traffic lights based on the estimated time of arrival and current light states of the vehicular traffic lights and the pedestrian traffic lights for providing right of way to the emergency vehicle; and
      monitoring status of the vehicular traffic lights and the one or more pedestrian traffic lights for verifying preemption of the vehicular traffic lights and the one or more pedestrian traffic lights.

13. An emergency vehicle traffic control system comprising:
   a processor; and
   a memory operably coupled to the processor and having program instructions stored therein, the processor being operable to execute the program instructions, the program instructions including:

receiving navigation information of an emergency vehicle approaching an intersection equipped with one or more vehicular traffic lights and one or more pedestrian traffic lights;

estimating a time of arrival at the intersection based on the navigation information; and controlling the vehicular traffic lights and the one or more pedestrian traffic lights based on the estimated time of arrival and current light states of the vehicular traffic lights and the pedestrian traffic lights for providing right of way to the emergency vehicle, wherein the controlling of the pedestrian traffic lights includes inhibiting a pedestrian clearance phase, and wherein inhibiting the pedestrian clearance phase includes disabling a pedestrian call button.

* * * * *